US012396079B2

(12) United States Patent
Li et al.

(10) Patent No.: US 12,396,079 B2
(45) Date of Patent: *Aug. 19, 2025

(54) SYSTEMS AND METHODS FOR CONTROLLING CURRENTS FLOWING THROUGH LIGHT EMITTING DIODES

(71) Applicant: ON-BRIGHT ELECTRONICS (SHANGHAI) CO., LTD., Shanghai (CN)

(72) Inventors: Ke Li, Shanghai (CN); Liqiang Zhu, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 105 days.

This patent is subject to a terminal disclaimer.

(21) Appl. No.: 18/144,096

(22) Filed: May 5, 2023

(65) Prior Publication Data

US 2024/0008151 A1 Jan. 4, 2024

Related U.S. Application Data

(63) Continuation of application No. 17/554,306, filed on Dec. 17, 2021, now Pat. No. 11,723,128, which is a (Continued)

(30) Foreign Application Priority Data

Dec. 27, 2019 (CN) ......................... 201911371960.8

(51) Int. Cl.
*H05B 45/31* (2020.01)
*H05B 45/10* (2020.01)
(Continued)

(52) U.S. Cl.
CPC ............. *H05B 45/31* (2020.01); *H05B 45/10* (2020.01)

(58) Field of Classification Search
CPC .. H05B 45/10; H05B 45/3575; H05B 45/385; H05B 45/31; H05B 45/3725;
(Continued)

(56) References Cited

U.S. PATENT DOCUMENTS 3,803,452 A 4/1974 Goldschmied
3,899,713 A 8/1975 Barkan et al.
(Continued)

FOREIGN PATENT DOCUMENTS

CN 1448005 A 10/2003
CN 101040570 A 9/2007
(Continued)

OTHER PUBLICATIONS

United States Patent and Trademark Office, Notice of Allowance mailed Aug. 3, 2023, in U.S. Appl. No. 18/081,528.
(Continued)

*Primary Examiner* — Wei (Victor) Y Chan
(74) *Attorney, Agent, or Firm* — Faegre Drinker Biddle & Reath LLP

(57) ABSTRACT

System and method for controlling one or more light emitting diodes. For example, the system includes: a phase detector configured to process information associated with a rectified voltage generated by a rectifier and related to a TRIAC dimmer, the rectified voltage corresponding to a first waveform during a first half cycle of an AC voltage and corresponding to a second waveform during a second half cycle of the AC voltage, the phase detector being further configured to generate a phase detection signal representing a first time duration during which the first waveform indicates that the rectified voltage is larger than a predetermined threshold and representing a second time duration during which the second waveform indicates that the rectified voltage is larger than the predetermined threshold; and a
(Continued)

mode detector configured to process information associated with the rectified voltage.

30 Claims, 13 Drawing Sheets

Related U.S. Application Data continuation of application No. 17/127,711, filed on Dec. 18, 2020, now Pat. No. 11,252,799.

(51) Int. Cl.
*H05B 45/3575* (2020.01)
*H05B 45/385* (2020.01)

(58) Field of Classification Search
CPC ...... H05B 45/395; H05B 47/16; H05B 45/37; H05B 45/14; H05B 47/10; H05B 45/382; H05B 45/345; H05B 39/044; H05B 39/08; H05B 45/375; H05B 45/44
See application file for complete search history.

(56) References Cited

U.S. PATENT DOCUMENTS 4,253,045 A 2/1981 Weber
5,144,205 A 9/1992 Motto et al.
5,249,298 A 9/1993 Bolan et al.
5,504,398 A 4/1996 Rothenbuhler
5,949,197 A 9/1999 Kastner
6,196,208 B1 3/2001 Masters
6,218,788 B1 4/2001 Chen et al.
6,229,271 B1 5/2001 Liu
6,278,245 B1 8/2001 Li et al.
7,038,399 B2 5/2006 Lys et al.
7,649,327 B2 1/2010 Peng
7,759,881 B1 7/2010 Melanson
7,825,715 B1 11/2010 Greenberg
7,880,400 B2 2/2011 Zhou et al.
7,944,153 B2 5/2011 Greenfeld
8,018,171 B1 9/2011 Melanson et al.
8,098,021 B2 1/2012 Wang et al.
8,129,976 B2 3/2012 Blakeley
8,134,302 B2 3/2012 Yang et al.
8,278,832 B2 10/2012 Hung et al.
8,373,313 B2 2/2013 Garcia et al.
8,378,583 B2 2/2013 Hying et al.
8,378,588 B2 2/2013 Kuo et al.
8,378,589 B2 2/2013 Kuo et al.
8,415,901 B2 4/2013 Recker et al.
8,432,438 B2 4/2013 Ryan et al.
8,497,637 B2 7/2013 Liu
8,558,477 B2 10/2013 Bordin et al.
8,569,956 B2 10/2013 Shteynberg et al.
8,644,041 B2 2/2014 Pansier
8,653,750 B2 2/2014 Deurenberg et al.
8,686,668 B2 4/2014 Grotkowski et al.
8,698,407 B1 4/2014 Chen et al.
8,698,419 B2 4/2014 Yan et al.
8,716,882 B2 5/2014 Pettler et al.
8,742,674 B2 6/2014 Shteynberg et al.
8,829,819 B1 9/2014 Angeles et al.
8,890,440 B2 11/2014 Yan et al.
8,896,288 B2 11/2014 Choi et al.
8,941,323 B1 1/2015 Wu et al.
8,941,324 B2 1/2015 Zhou et al.
8,941,328 B2 1/2015 Wu et al.
8,947,010 B2 2/2015 Barrow et al.
9,030,122 B2 5/2015 Yan et al.
9,084,316 B2 7/2015 Melanson et al.
9,131,581 B1 9/2015 Hsia et al.
9,148,050 B2 9/2015 Chiang
9,167,638 B2 10/2015 Le
9,173,258 B2 10/2015 Ekbote
9,207,265 B1 12/2015 Grisamore et al.
9,220,133 B2 12/2015 Salvestrini et al.
9,220,136 B2 12/2015 Zhang et al.
9,247,623 B2 1/2016 Recker et al.
9,247,625 B2 1/2016 Recker et al.
9,301,349 B2 3/2016 Zhu et al.
9,332,609 B1 5/2016 Rhodes et al.
9,402,293 B2 7/2016 Vaughan et al.
9,408,269 B2 8/2016 Zhu et al.
9,414,455 B2 8/2016 Zhou et al.
9,467,137 B2 10/2016 Eum et al.
9,480,118 B2 10/2016 Liao et al.
9,485,833 B2 11/2016 Datta et al.
9,554,432 B2 1/2017 Zhu et al.
9,572,224 B2 2/2017 Gaknoki et al.
9,585,222 B2 2/2017 Zhu et al.
9,655,188 B1 5/2017 Lewis et al.
9,661,702 B2 5/2017 Mednik et al.
9,723,676 B2 8/2017 Ganick et al.
9,750,107 B2 8/2017 Zhu et al.
9,781,786 B2 10/2017 Ho et al.
9,820,344 B1 11/2017 Papanicolaou
9,883,561 B1 1/2018 Liang et al.
9,883,562 B2 1/2018 Zhu et al.
9,961,734 B2 5/2018 Zhu et al.
10,054,271 B2 8/2018 Xiong et al.
10,143,051 B2 11/2018 Liu et al.
10,153,684 B2 12/2018 Liu et al.
10,194,500 B2 1/2019 Zhu et al.
10,264,642 B2 4/2019 Liang et al.
10,292,217 B2 5/2019 Zhu et al.
10,299,328 B2 5/2019 Fu et al.
10,334,677 B2 6/2019 Zhu et al.
10,342,087 B2 7/2019 Zhu et al.
10,362,643 B2 7/2019 Kim et al.
10,375,785 B2 8/2019 Li et al.
10,383,187 B2 8/2019 Liao et al.
10,405,392 B1 9/2019 Shi et al.
10,447,171 B2 10/2019 Newman et al.
10,448,469 B2 10/2019 Zhu et al.
10,448,470 B2 10/2019 Zhu et al.
10,455,657 B2 10/2019 Zhu et al.
10,499,467 B2 12/2019 Wang
10,512,131 B2 * 12/2019 Zhu ........................ H05B 45/10
10,530,268 B2 1/2020 Newman et al.
10,531,534 B1 1/2020 Zhou
10,568,185 B1 2/2020 Ostrovsky et al.
10,616,975 B2 4/2020 Gotou et al.
10,687,397 B2 6/2020 Zhu et al.
10,785,837 B2 9/2020 Li et al.
10,827,588 B2 11/2020 Zhu et al.
10,973,095 B2 * 4/2021 Zhu ........................ H05B 45/31
10,999,903 B2 5/2021 Li et al.
10,999,904 B2 5/2021 Zhu et al.
11,026,304 B2 6/2021 Li et al.
11,183,996 B2 11/2021 Zhu et al.
11,201,612 B2 12/2021 Zhu et al.
11,206,015 B2 12/2021 Zhu et al.
11,212,885 B2 12/2021 Liao et al.
11,224,105 B2 * 1/2022 Yang .................... H05B 45/357
11,252,799 B2 * 2/2022 Li ........................ H05B 45/315
11,297,704 B2 4/2022 Zhu et al.
11,405,992 B2 8/2022 Li et al.
11,564,299 B2 1/2023 Li et al.
11,570,859 B2 1/2023 Zhu et al.
11,638,335 B2 4/2023 Zhu et al.
11,678,417 B2 6/2023 Yang et al.
11,695,401 B2 7/2023 Zhu et al.
11,723,128 B2 8/2023 Li et al.
11,743,984 B2 8/2023 Li et al.
11,784,638 B2 10/2023 Zhu et al.
11,792,901 B2 10/2023 Zhu et al.
11,856,670 B2 12/2023 Li et al.
11,937,350 B2 3/2024 Zhu et al.
12,009,825 B2 6/2024 Zhu et al.
12,089,302 B2 9/2024 Li et al.
12,193,124 B2 1/2025 Zhu et al.
2006/0022648 A1 2/2006 Ben-Yaakov et al.
2007/0182338 A1 8/2007 Shteynberg et al.

(56) References Cited

U.S. PATENT DOCUMENTS

2007/0182699 A1 8/2007 Ha et al.
2007/0267978 A1 11/2007 Shteynberg et al.
2008/0224629 A1 9/2008 Melanson
2008/0224633 A1 9/2008 Melanson et al.
2008/0278092 A1 11/2008 Lys et al.
2009/0021469 A1 1/2009 Yeo et al.
2009/0085494 A1 4/2009 Summerland
2009/0251059 A1 10/2009 Veltman
2010/0141153 A1 6/2010 Recker et al.
2010/0148691 A1 6/2010 Kuo et al.
2010/0156319 A1 6/2010 Melanson
2010/0164406 A1 7/2010 Kost et al.
2010/0176733 A1 7/2010 King
2010/0207536 A1 8/2010 Burdalski et al.
2010/0213859 A1 8/2010 Shteynberg et al.
2010/0219766 A1 9/2010 Kuo et al.
2010/0231136 A1* 9/2010 Reisenauer ........ H05B 45/3725 315/276
2011/0012530 A1 1/2011 Zheng et al.
2011/0037399 A1 2/2011 Hung et al.
2011/0074302 A1 3/2011 Draper et al.
2011/0080110 A1 4/2011 Nuhfer et al.
2011/0080111 A1 4/2011 Nuhfer et al.
2011/0080112 A1 4/2011 Shearer et al.
2011/0101867 A1 5/2011 Wang et al.
2011/0121744 A1 5/2011 Salvestrini et al.
2011/0121754 A1 5/2011 Shteynberg et al.
2011/0133662 A1 6/2011 Yan et al.
2011/0140620 A1 6/2011 Lin et al.
2011/0140621 A1 6/2011 Yi et al.
2011/0187283 A1 8/2011 Wang et al.
2011/0227490 A1 9/2011 Huynh
2011/0260619 A1 10/2011 Sadwick et al.
2011/0285301 A1 11/2011 Kuang et al.
2011/0291583 A1 12/2011 Shen
2011/0309759 A1 12/2011 Shteynberg et al.
2012/0001548 A1 1/2012 Recker et al.
2012/0032604 A1 2/2012 Hontele
2012/0056553 A1 3/2012 Koolen et al.
2012/0069616 A1 3/2012 Kitamura et al.
2012/0080944 A1 4/2012 Recker et al.
2012/0081009 A1 4/2012 Shteynberg et al.
2012/0081032 A1 4/2012 Huang
2012/0081035 A1* 4/2012 McCune, Jr. ........ H05B 45/375 315/297
2012/0146526 A1 6/2012 Lam et al.
2012/0181944 A1 7/2012 Jacobs et al.
2012/0181946 A1 7/2012 Melanson
2012/0187857 A1 7/2012 Ulmann et al.
2012/0242237 A1 9/2012 Chen et al.
2012/0242238 A1 9/2012 Chen et al.
2012/0262093 A1 10/2012 Recker et al.
2012/0268031 A1 10/2012 Zhou et al.
2012/0274227 A1 11/2012 Zheng et al.
2012/0286663 A1 11/2012 Puvanakijjakorn et al.
2012/0286679 A1 11/2012 Liu
2012/0299500 A1 11/2012 Sadwick et al.
2012/0299501 A1 11/2012 Kost et al.
2012/0299511 A1 11/2012 Montante et al.
2012/0319604 A1 12/2012 Walters
2012/0326616 A1 12/2012 Sumitani et al.
2013/0009561 A1 1/2013 Briggs
2013/0020965 A1 1/2013 Kang et al.
2013/0026942 A1 1/2013 Ryan et al.
2013/0026945 A1 1/2013 Ganick et al.
2013/0027528 A1 1/2013 Staats et al.
2013/0034172 A1 2/2013 Pettler et al.
2013/0043726 A1 2/2013 Krishnamoorthy et al.
2013/0049631 A1 2/2013 Riesebosch
2013/0063047 A1 3/2013 Veskovic
2013/0134904 A1* 5/2013 Yau ...................... H05B 45/385 315/297
2013/0141001 A1 6/2013 Datta et al.
2013/0154487 A1 6/2013 Kuang et al.
2013/0162155 A1 6/2013 Matsuda et al.
2013/0162158 A1 6/2013 Pollischansky
2013/0169177 A1 7/2013 Liao et al.
2013/0175931 A1 7/2013 Sadwick
2013/0181630 A1 7/2013 Taipale et al.
2013/0187568 A1 7/2013 Jelaca et al.
2013/0193866 A1 8/2013 Datta et al.
2013/0193879 A1 8/2013 Sadwick et al.
2013/0194848 A1 8/2013 Bernardinis et al.
2013/0215655 A1 8/2013 Yang et al.
2013/0223107 A1 8/2013 Zhang et al.
2013/0229121 A1 9/2013 Otake et al.
2013/0241427 A1 9/2013 Kesterson et al.
2013/0241428 A1 9/2013 Takeda
2013/0241441 A1 9/2013 Myers et al.
2013/0242622 A1 9/2013 Peng et al.
2013/0249431 A1 9/2013 Shteynberg et al.
2013/0278159 A1 10/2013 Del et al.
2013/0307430 A1 11/2013 Blom
2013/0307431 A1 11/2013 Zhu et al.
2013/0307434 A1 11/2013 Zhang et al.
2013/0342127 A1 12/2013 Pan et al.
2013/0343090 A1 12/2013 Eom et al.
2014/0009082 A1 1/2014 King et al.
2014/0029315 A1 1/2014 Zhang et al.
2014/0049177 A1 2/2014 Kulczycki et al.
2014/0063857 A1 3/2014 Peng et al.
2014/0078790 A1 3/2014 Lin et al.
2014/0103829 A1 4/2014 Kang
2014/0132172 A1 5/2014 Zhu et al.
2014/0160809 A1 6/2014 Lin et al.
2014/0176016 A1 6/2014 Li et al.
2014/0177280 A1 6/2014 Yang et al.
2014/0197760 A1 7/2014 Radermacher
2014/0265898 A1 9/2014 Del et al.
2014/0265907 A1 9/2014 Su et al.
2014/0265935 A1 9/2014 Sadwick et al.
2014/0268935 A1 9/2014 Chiang
2014/0300274 A1 10/2014 Acatrinei
2014/0320031 A1 10/2014 Wu et al.
2014/0333228 A1 11/2014 Angeles et al.
2014/0346973 A1 11/2014 Zhu et al.
2014/0354157 A1 12/2014 Morales
2014/0354165 A1 12/2014 Malyna et al.
2014/0354170 A1 12/2014 Gredler et al.
2015/0015159 A1 1/2015 Wang et al.
2015/0035450 A1 2/2015 Werner
2015/0048757 A1 2/2015 Boonen et al.
2015/0062981 A1 3/2015 Fang et al.
2015/0077009 A1 3/2015 Kunimatsu
2015/0091470 A1 4/2015 Zhou et al.
2015/0137704 A1 5/2015 Angeles et al.
2015/0173140 A1 6/2015 Wu et al.
2015/0312978 A1 10/2015 Vaughan et al.
2015/0312982 A1 10/2015 Melanson
2015/0312988 A1 10/2015 Liao et al.
2015/0318789 A1 11/2015 Yang et al.
2015/0333764 A1 11/2015 Pastore et al.
2015/0357910 A1 12/2015 Murakami et al.
2015/0359054 A1 12/2015 Lin et al.
2015/0366010 A1 12/2015 Mao et al.
2015/0382424 A1 12/2015 Knapp et al.
2016/0014861 A1 1/2016 Zhu et al.
2016/0014865 A1 1/2016 Zhu et al.
2016/0037604 A1 2/2016 Zhu et al.
2016/0113077 A1 4/2016 Akiyama
2016/0119998 A1 4/2016 Linnartz et al.
2016/0128142 A1 5/2016 Arulandu et al.
2016/0134187 A1 5/2016 Pregitzer et al.
2016/0277411 A1 9/2016 Dani et al.
2016/0286617 A1 9/2016 Takahashi et al.
2016/0323957 A1 11/2016 Hu et al.
2016/0338163 A1 11/2016 Zhu et al.
2017/0006684 A1 1/2017 Tu et al.
2017/0027029 A1 1/2017 Hu et al.
2017/0055323 A1* 2/2017 Lim ....................... H05B 47/16
2017/0064787 A1 3/2017 Liao et al.
2017/0099712 A1 4/2017 Hilgers et al.
2017/0181235 A1 6/2017 Zhu et al.
2017/0196063 A1 7/2017 Zhu et al.

(56) References Cited

U.S. PATENT DOCUMENTS

| | | | | |
|---|---|---|---|---|
| 2017/0251532 | A1 | 8/2017 | Wang et al. | |
| 2017/0311409 | A1 | 10/2017 | Zhu et al. | |
| 2017/0354008 | A1 | 12/2017 | Eum et al. | |
| 2017/0359880 | A1 | 12/2017 | Zhu et al. | |
| 2018/0035507 | A1 | 2/2018 | Kumada et al. | |
| 2018/0103520 | A1 | 4/2018 | Phu et al. | |
| 2018/0110104 | A1 | 4/2018 | Liang et al. | |
| 2018/0115234 | A1 | 4/2018 | Liu et al. | |
| 2018/0139816 | A1 | 5/2018 | Liu et al. | |
| 2018/0184490 | A1 | 6/2018 | Ido | |
| 2018/0263089 | A1* | 9/2018 | Seyler | H05B 45/48 |
| 2018/0288845 | A1 | 10/2018 | Zhu et al. | |
| 2018/0310376 | A1 | 10/2018 | Huang et al. | |
| 2019/0069364 | A1 | 2/2019 | Zhu et al. | |
| 2019/0069366 | A1 | 2/2019 | Liao et al. | |
| 2019/0082507 | A1 | 3/2019 | Zhu et al. | |
| 2019/0104583 | A1 | 4/2019 | Konishi et al. | |
| 2019/0124736 | A1 | 4/2019 | Zhu et al. | |
| 2019/0166667 | A1 | 5/2019 | Li et al. | |
| 2019/0230755 | A1 | 7/2019 | Zhu et al. | |
| 2019/0327810 | A1 | 10/2019 | Zhu et al. | |
| 2019/0350055 | A1 | 11/2019 | Wu et al. | |
| 2019/0350060 | A1 | 11/2019 | Li et al. | |
| 2019/0364628 | A1 | 11/2019 | Chen et al. | |
| 2019/0380183 | A1 | 12/2019 | Li et al. | |
| 2020/0100340 | A1 | 3/2020 | Zhu et al. | |
| 2020/0146121 | A1 | 5/2020 | Zhu et al. | |
| 2020/0205263 | A1* | 6/2020 | Zhu | H05B 45/395 |
| 2020/0205264 | A1 | 6/2020 | Zhu et al. | |
| 2020/0267817 | A1 | 8/2020 | Yang et al. | |
| 2020/0305247 | A1 | 9/2020 | Li et al. | |
| 2020/0375001 | A1 | 11/2020 | Jung et al. | |
| 2021/0007195 | A1 | 1/2021 | Zhu et al. | |
| 2021/0007196 | A1 | 1/2021 | Zhu et al. | |
| 2021/0045213 | A1 | 2/2021 | Zhu et al. | |
| 2021/0153313 | A1* | 5/2021 | Li | H05B 47/165 |
| 2021/0195709 | A1 | 6/2021 | Li et al. | |
| 2021/0204375 | A1 | 7/2021 | Li et al. | |
| 2022/0038085 | A1 | 2/2022 | Zhu et al. | |
| 2022/0149829 | A1 | 5/2022 | Zhu et al. | |
| 2022/0209762 | A1 | 6/2022 | Zhu et al. | |
| 2022/0210880 | A1 | 6/2022 | Li et al. | |
| 2022/0217824 | A1 | 7/2022 | Zhu et al. | |
| 2022/0225480 | A1 | 7/2022 | Li et al. | |
| 2022/0225483 | A1 | 7/2022 | Yang et al. | |
| 2023/0180360 | A1 | 6/2023 | Zhu et al. | |
| 2023/0225028 | A1 | 7/2023 | Li et al. | |
| 2024/0049371 | A1 | 2/2024 | Li et al. | |
| 2024/0097665 | A1 | 3/2024 | Zhu et al. | |
| 2024/0147591 | A1 | 5/2024 | Zhu et al. | |
| 2024/0179817 | A1 | 5/2024 | Li et al. | |
| 2024/0334563 | A1 | 10/2024 | Zhu et al. | |
| 2025/0071869 | A1 | 2/2025 | Li et al. | |

FOREIGN PATENT DOCUMENTS

| | | | |
|---|---|---|---|
| CN | 101657057 | A | 2/2010 |
| CN | 101868090 | A | 10/2010 |
| CN | 101896022 | A | 11/2010 |
| CN | 101917804 | A | 12/2010 |
| CN | 101938865 | A | 1/2011 |
| CN | 101998734 | A | 3/2011 |
| CN | 102014540 | A | 4/2011 |
| CN | 102014551 | A | 4/2011 |
| CN | 102056378 | A | 5/2011 |
| CN | 102209412 | A | 10/2011 |
| CN | 102300375 | A | 12/2011 |
| CN | 102347607 | A | 2/2012 |
| CN | 102387634 | A | 3/2012 |
| CN | 102474953 | A | 5/2012 |
| CN | 102497706 | A | 6/2012 |
| CN | 102612194 | A | 7/2012 |
| CN | 202353859 | U | 7/2012 |
| CN | 102668717 | A | 9/2012 |
| CN | 102695330 | A | 9/2012 |
| CN | 102791056 | A | 11/2012 |
| CN | 102843836 | A | 12/2012 |
| CN | 202632722 | U | 12/2012 |
| CN | 102870497 | A | 1/2013 |
| CN | 102946674 | A | 2/2013 |
| CN | 103004290 | A | 3/2013 |
| CN | 103024994 | A | 4/2013 |
| CN | 103096606 | A | 5/2013 |
| CN | 103108470 | A | 5/2013 |
| CN | 103260302 | A | 8/2013 |
| CN | 103313472 | A | 9/2013 |
| CN | 103369802 | A | 10/2013 |
| CN | 103379712 | A | 10/2013 |
| CN | 103428953 | A | 12/2013 |
| CN | 103458579 | A | 12/2013 |
| CN | 103547014 | A | 1/2014 |
| CN | 103648219 | A | 3/2014 |
| CN | 103716934 | A | 4/2014 |
| CN | 103781229 | A | 5/2014 |
| CN | 103858524 | A | 6/2014 |
| CN | 203675408 | U | 6/2014 |
| CN | 103945614 | A | 7/2014 |
| CN | 103957634 | A | 7/2014 |
| CN | 104066254 | A | 9/2014 |
| CN | 104619077 | A | 5/2015 |
| CN | 204392621 | U | 6/2015 |
| CN | 104768265 | A | 7/2015 |
| CN | 104902653 | A | 9/2015 |
| CN | 105072742 | A | 11/2015 |
| CN | 105246218 | A | 1/2016 |
| CN | 105265019 | A | 1/2016 |
| CN | 105423140 | A | 3/2016 |
| CN | 105591553 | A | 5/2016 |
| CN | 105873269 | A | 8/2016 |
| CN | 105992440 | A | 10/2016 |
| CN | 106105395 | A | 11/2016 |
| CN | 106163009 | A | 11/2016 |
| CN | 205812458 | U | 12/2016 |
| CN | 106332374 | A | 1/2017 |
| CN | 106332390 | A | 1/2017 |
| CN | 106358337 | A | 1/2017 |
| CN | 106413189 | A | 2/2017 |
| CN | 206042434 | U | 3/2017 |
| CN | 106604460 | A | 4/2017 |
| CN | 106793246 | A | 5/2017 |
| CN | 106888524 | A | 6/2017 |
| CN | 106912144 | A | 6/2017 |
| CN | 107046751 | A | 8/2017 |
| CN | 107069726 | A | 8/2017 |
| CN | 107645804 | A | 1/2018 |
| CN | 107995747 | A | 5/2018 |
| CN | 107995750 | A | 5/2018 |
| CN | 207460551 | U | 6/2018 |
| CN | 108337764 | A | 7/2018 |
| CN | 108366460 | A | 8/2018 |
| CN | 207744191 | U | 8/2018 |
| CN | 207910676 | U | 9/2018 |
| CN | 108834259 | A | 11/2018 |
| CN | 109246885 | A | 1/2019 |
| CN | 208572500 | U | 3/2019 |
| CN | 109729621 | A | 5/2019 |
| CN | 110086362 | A | 8/2019 |
| CN | 110099495 | A | 8/2019 |
| CN | 110493913 | A | 11/2019 |
| EP | 2403318 | A1 | 1/2012 |
| EP | 2590477 | A1 | 5/2013 |
| EP | 2938164 | A2 | 10/2015 |
| JP | 2008-010152 | A | 1/2008 |
| JP | 2011-249328 | A | 12/2011 |
| TW | 201125441 | A | 7/2011 |
| TW | 201132241 | A | 9/2011 |
| TW | 201143501 | A | 12/2011 |
| TW | 201143530 | A | 12/2011 |
| TW | 201146087 | A | 12/2011 |
| TW | 201204168 | A | 1/2012 |
| TW | 201208463 | A | 2/2012 |
| TW | 201208481 | A | 2/2012 |
| TW | 201208486 | A | 2/2012 |
| TW | 201215228 | A | 4/2012 |

(56) References Cited

FOREIGN PATENT DOCUMENTS

| | | | |
|---|---|---|---|
| TW | 201233021 | A | 8/2012 |
| TW | 201244543 | A | 11/2012 |
| TW | I387396 | B | 2/2013 |
| TW | 201315118 | A | 4/2013 |
| TW | 201322825 | A | 6/2013 |
| TW | 201336345 | A | 9/2013 |
| TW | 201342987 | A | 10/2013 |
| TW | 201348909 | A | 12/2013 |
| TW | I422130 | B | 1/2014 |
| TW | I423732 | B | 1/2014 |
| TW | 201412189 | A | 3/2014 |
| TW | 201414146 | A | 4/2014 |
| TW | I434616 | B | 4/2014 |
| TW | M477115 | U | 4/2014 |
| TW | 201417626 | A | 5/2014 |
| TW | 201417631 | A | 5/2014 |
| TW | 201422045 | A | 6/2014 |
| TW | 201424454 | A | 6/2014 |
| TW | I441428 | B | 6/2014 |
| TW | I448198 | B | 8/2014 |
| TW | 201503756 | A | 1/2015 |
| TW | 201515514 | A | 4/2015 |
| TW | I496502 | B | 8/2015 |
| TW | 201603644 | A | 1/2016 |
| TW | 201607368 | A | 2/2016 |
| TW | I524814 | B | 3/2016 |
| TW | I535175 | B | 5/2016 |
| TW | I540809 | B | 7/2016 |
| TW | 201630468 | A | 8/2016 |
| TW | 201639415 | A | 11/2016 |
| TW | I630842 | B | 7/2018 |
| TW | 201909699 | A | 3/2019 |
| TW | 201927074 | A | 7/2019 |
| WO | 2008/112820 | A2 | 9/2008 |

OTHER PUBLICATIONS

United States Patent and Trademark Office, Notice of Allowance mailed Dec. 19, 2022, in U.S. Appl. No. 17/528,153.
United States Patent and Trademark Office, Notice of Allowance mailed Feb. 14, 2023, in U.S. Appl. No. 17/520,573.
United States Patent and Trademark Office, Notice of Allowance mailed Feb. 8, 2023, in U.S. Appl. No. 17/554,306.
United States Patent and Trademark Office, Notice of Allowance mailed Jan. 19, 2023, in U.S. Appl. No. 17/528,153.
United States Patent and Trademark Office, Notice of Allowance mailed Jun. 6, 2023, in U.S. Appl. No. 17/578,706.
United States Patent and Trademark Office, Notice of Allowance mailed May 30, 2023, in U.S. Appl. No. 17/503,238.
United States Patent and Trademark Office, Notice of Allowance mailed Nov. 2, 2022, in U.S. Appl. No. 17/023,632.
United States Patent and Trademark Office, Notice of Allowance mailed Oct. 4, 2022, in U.S. Appl. No. 17/554,306.
United States Patent and Trademark Office, Notice of Allowance mailed Sep. 12, 2022, in U.S. Appl. No. 17/023,632.
United States Patent and Trademark Office, Office Action mailed Apr. 26, 2022, in U.S. Appl. No. 17/023,632.
United States Patent and Trademark Office, Office Action mailed Dec. 15, 2021, in U.S. Appl. No. 17/023,632.
United States Patent and Trademark Office, Office Action mailed Feb. 3, 2023, in U.S. Appl. No. 17/503,238.
United States Patent and Trademark Office, Office Action mailed Jan. 26, 2023, in U.S. Appl. No. 17/578,706.
United States Patent and Trademark Office, Office Action mailed Jul. 15, 2022, in U.S. Appl. No. 17/528,153.
United States Patent and Trademark Office, Office Action mailed Jun. 12, 2023, in U.S. Appl. No. 18/103,971.
United States Patent and Trademark Office, Office Action mailed Mar. 22, 2023, in U.S. Appl. No. 17/502,916.
United States Patent and Trademark Office, Office Action mailed Oct. 19, 2022, in U.S. Appl. No. 17/520,573.
United States Patent and Trademark Office, Office Action mailed Oct. 5, 2022, in U.S. Appl. No. 17/502,916.
United States Patent and Trademark Office, Office Action mailed Sep. 12, 2022, in U.S. Appl. No. 17/503,238.
United States Patent and Trademark Office, Office Action mailed Sep. 14, 2022, in U.S. Appl. No. 17/545,752.
United States Patent and Trademark Office, Office Action mailed Sep. 16, 2022, in U.S. Appl. No. 17/578,706.
China Patent Office, Notice of Allowance mailed Sep. 1, 2021, in Application No. 201911371960.8.
China Patent Office, Office Action mailed Apr. 15, 2021, in Application No. 201911371960.8.
China Patent Office, Office Action mailed Apr. 30, 2021, in Application No. 201910719931.X.
China Patent Office, Office Action mailed Aug. 28, 2015, in Application No. 201410322602.9.
China Patent Office, Office Action mailed Aug. 8, 2015, in Application No. 201410172086.6.
China Patent Office, Office Action mailed Dec. 14, 2015, in Application No. 201210166672.0.
China Patent Office, Office Action mailed Dec. 3, 2018, in Application No. 201710557179.4.
China Patent Office, Office Action mailed Feb. 1, 2021, in Application No. 201911140844.5.
China Patent Office, Office Action mailed Feb. 3, 2021, in Application No. 201911316902.5.
China Patent Office, Office Action mailed Jan. 17, 2022, in Application No. 201910124049.0.
China Patent Office, Office Action mailed Jan. 9, 2020, in Application No. 201710828263.5.
China Patent Office, Office Action mailed Jul. 7, 2014, in Application No. 201210468505.1.
China Patent Office, Office Action mailed Jun. 3, 2014, in Application No. 201110103130.4.
China Patent Office, Office Action mailed Jun. 30, 2015, in Application No. 201410171893.6.
China Patent Office, Office Action mailed Mar. 2, 2016, in Application No. 201410172086.6.
China Patent Office, Office Action mailed Mar. 22, 2016, in Application No. 201410322612.2.
China Patent Office, Office Action mailed Mar. 22, 2019, in Application No. 201711464007.9.
China Patent Office, Office Action mailed May 26, 2021, in Application No. 201910124049.0.
China Patent Office, Office Action mailed Nov. 15, 2014, in Application No. 201210166672.0.
China Patent Office, Office Action mailed Nov. 15, 2021, in Application No. 201911316902.5.
China Patent Office, Office Action mailed Nov. 2, 2020, in Application No. 201910124049.0.
China Patent Office, Office Action mailed Nov. 23, 2021, in Application No. 201911140844.5.
China Patent Office, Office Action mailed Nov. 29, 2018, in Application No. 201710828263.5.
China Patent Office, Office Action mailed Oct. 19, 2015, in Application No. 201410322612.2.
China Patent Office, Office Action mailed Sep. 2, 2016, in Application No. 201510103579.9.
Qi et al., "Sine Wave Dimming Circuit Based on PIC16 MCU," Electronic Technology Application in 2014, vol. 10, (2014).
Taiwan Intellectual Property Office, Office Action mailed Apr. 18, 2016, in Application No. 103140989.
Taiwan Intellectual Property Office, Office Action mailed Apr. 27, 2020, in Application No. 108116002.
Taiwan Intellectual Property Office, Office Action mailed Apr. 7, 2021, in Application No. 109111042.
Taiwan Intellectual Property Office, Office Action mailed Aug. 23, 2017, in Application No. 106103535.
Taiwan Intellectual Property Office, Office Action mailed Aug. 27, 2020, in Application No. 107107508.
Taiwan Intellectual Property Office, Office Action mailed Dec. 27, 2019, in Application No. 108116002.

(56) References Cited

OTHER PUBLICATIONS

Taiwan Intellectual Property Office, Office Action mailed Feb. 11, 2020, in Application No. 107107508.
Taiwan Intellectual Property Office, Office Action mailed Feb. 27, 2018, in Application No. 106136242.
Taiwan Intellectual Property Office, Office Action mailed Feb. 6, 2018, in Application No. 106130686.
Taiwan Intellectual Property Office, Office Action mailed Jan. 14, 2019, in Application No. 107107508.
Taiwan Intellectual Property Office, Office Action mailed Jan. 21, 2021, in Application No. 109108798.
Taiwan Intellectual Property Office, Office Action mailed Jan. 4, 2021, in Application No. 109111042.
Taiwan Intellectual Property Office, Office Action mailed Jan. 7, 2014, in Application No. 100119272.
Taiwan Intellectual Property Office, Office Action mailed Jun. 16, 2020, in Application No. 108136083.
Taiwan Intellectual Property Office, Office Action mailed Jun. 9, 2014, in Application No. 101124982.
Taiwan Intellectual Property Office, Office Action mailed May 28, 2019, in Application No. 107112306.
Taiwan Intellectual Property Office, Office Action mailed Nov. 13, 2015, in Application No. 103141628.
Taiwan Intellectual Property Office, Office Action mailed Nov. 30, 2020, in Application No. 107107508.
Taiwan Intellectual Property Office, Office Action mailed Oct. 31, 2019, in Application No. 107107508.
Taiwan Intellectual Property Office, Office Action mailed Sep. 17, 2015, in Application No. 103127108.
Taiwan Intellectual Property Office, Office Action mailed Sep. 17, 2015, in Application No. 103127620.
Taiwan Intellectual Property Office, Office Action mailed Sep. 25, 2014, in Application No. 101148716.
Taiwan Intellectual Property Office, Office Action mailed Sep. 9, 2020, in Application No. 108148566.
United States Patent and Trademark Office, Notice of Allowance mailed Apr. 12, 2023, in U.S. Appl. No. 17/545,752.
United States Patent and Trademark Office, Notice of Allowance mailed Feb. 7, 2024, in U.S. Appl. No. 17/502,916.
United States Patent and Trademark Office, Office Action mailed Apr. 1, 2024, in U.S. Appl. No. 18/242,474.
United States Patent and Trademark Office, Office Action mailed Jan. 22, 2024, in U.S. Appl. No. 18/220,584.
United States Patent and Trademark Office, Office Action mailed Mar. 21, 2024, in U.S. Appl. No. 18/238,990.
United States Patent and Trademark Office, Office Action mailed Sep. 19, 2023, in U.S. Appl. No. 17/502,916.
United States Patent and Trademark Office, Office Action mailed Aug. 20, 2024, in U.S. Appl. No. 18/238,990.
United States Patent and Trademark Office, Office Action mailed Aug. 21, 2024, in U.S. Appl. No. 18/429,816.
United States Patent and Trademark Office, Office Action mailed Jan. 17, 2025, in U.S. Appl. No. 18/238,990.
United States Patent and Trademark Office, Office Action mailed Jan. 31, 2025, in U.S. Appl. No. 18/429,816.
United States Patent and Trademark Office, Notice of Allowance mailed Jun. 6, 2025, in U.S. Appl. No. 18/238,990.
United States Patent and Trademark Office, Notice of Allowance mailed Jun. 27, 2025, in U.S. Appl. No. 18/500,903.
United States Patent and Trademark Office, Notice of Allowance mailed Apr. 28, 2025, in U.S. Appl. No. 18/429,816.

* cited by examiner

SYSTEMS AND METHODS FOR CONTROLLING CURRENTS FLOWING THROUGH LIGHT EMITTING DIODES

1. CROSS-REFERENCES TO RELATED APPLICATIONS

This application is a continuation of U.S. patent application Ser. No. 17/554,306, filed Dec. 17, 2021, which is a continuation of U.S. patent application Ser. No. 17/127,711, filed Dec. 18, 2020, which claims priority to Chinese Patent Application No. 201911371960.8, filed Dec. 27, 2019, all of the above applications being incorporated by reference herein for all purposes.

2. BACKGROUND OF THE INVENTION

Certain embodiments of the present invention are directed to circuits. More particularly, some embodiments of the invention provide systems and methods for controlling currents. Merely by way of example, some embodiments of the invention have been applied to light emitting diodes (LEDs). But it would be recognized that the invention has a much broader range of applicability.

With development in the light-emitting diode (LED) lighting market, many LED manufacturers have placed LED lighting products at an important position in market development. The LEDs often provide high brightness, high efficiency, and long lifetime. The LED lighting products usually need dimmer technology to provide consumers with a unique visual experience. Since Triode for Alternating Current (TRIAC) dimmers have been widely used in other lighting systems such as incandescent lighting systems, the TRIAC dimmers are also increasingly being used in LED lighting systems.

Conventionally, the TRIAC dimmers usually are designed primarily for incandescent lights with pure resistive loads and low luminous efficiency. Such characteristics of incandescent lights often help to meet the requirements of TRIAC dimmers in holding currents. Therefore, the TRIAC dimmers usually are suitable for light dimming when used with incandescent lights. However, when the TRIAC dimmers are used with more efficient LEDs, it is often difficult to meet the requirements of TRIAC dimmers in holding currents due to the reduced input power needed to achieve equivalent illumination to that of incandescent lights. Therefore, conventional LED lighting systems often utilize bleeder units to provide compensation in order to satisfy the requirements of TRIAC dimmers in holding currents.

Additionally, certain TRIAC dimmers have a threshold voltage for current conduction in one direction and another threshold voltage for current conduction in another direction, with these threshold voltages being different in magnitude. The different threshold voltages can cause the TRIAC dimmers to process differently positive and negative values in the AC input signal and thus generate positive and negative waveforms of different sizes. Such difference in waveform size can cause flickering of the LEDs.

FIG. 1 is a simplified diagram showing a conventional TRIAC dimmer. As shown in FIG. 1, the TRIAC dimmer 100 includes a Triode for Alternating Current (TRIAC) 110, a Diode for Alternating Current (DIAC) 120, a variable resistor 130, and a capacitor 140. The TRIAC dimmer 100 includes terminals 102 and 104. The terminal 102 receives an alternating current (AC) input voltage 180 (e.g., VAC), and the terminal 104 is coupled to a LED driver chip 190 through a rectifier 150.

The TRIAC 110 includes three terminals, one terminal of which is configured to receive the alternating current (AC) input voltage 180 (e.g., VAC) through the terminal 102, another terminal of which is connected to a terminal of the rectifier 150 through the terminal 104, and yet another terminal of which is connected to a terminal of the DIAC 120. The capacitor 140 (e.g., capacitor $C_t$) includes two terminals, one terminal of which is connected to the terminal of the TRIAC 110 and another terminal of which is connected to one terminal of the variable resistor 130 (e.g., variable resistor $R_t$). Another terminal of the variable resistor 130 (e.g., variable resistor $R_t$) is configured to receive the AC input voltage 180 (e.g., VAC) through the terminal 102. The DIAC 120 includes two terminals, one terminal of which is connected to the terminal of the TRIAC 110 and another terminal of which is connected to both the terminal of the variable resistor 130 (e.g., variable resistor $R_t$) and the terminal of the capacitor 140 (e.g., capacitor $C_t$).

When the AC input voltage 180 (e.g., VAC) is in the positive half cycle during which the AC input voltage 180 (e.g., VAC) is larger than zero, the voltage at the node $T_1$ is higher than the voltage at the node $T_2$ so that the RC charging circuit that includes the variable resistor 130 (e.g., variable resistor $R_t$) and the capacitor 140 (e.g., capacitor $C_t$) charges the capacitor 140 (e.g., capacitor $C_t$). The voltage drop between two terminals of the capacitor 140 (e.g., capacitor $C_t$) is equal to the voltage at the node G minus the voltage at the node $T_2$. If the voltage drop between two terminals of the capacitor 140 (e.g., capacitor $C_t$) becomes larger than a predetermined positive-direction voltage that is equal to a positive-direction threshold voltage (e.g., $V_{BD}$), the DIAC 120 becomes turned on and the TRIAC 110 is also turned on, so the voltage at the node $T_1$ and the voltage at the node $T_2$ become equal, causing the capacitor 140 (e.g., capacitor $C_t$) to discharge through the variable resistor 130 (e.g., variable resistor $R_t$). The positive-direction threshold voltage (e.g., $V_{BD}$) is larger than zero volts (e.g., being equal to about 30 volts).

When the AC input voltage 180 (e.g., VAC) is in the negative half cycle during which the AC input voltage 180 (e.g., VAC) is smaller than zero, the voltage at the node $T_1$ is lower than the voltage at the node $T_2$ so that the RC charging circuit that includes the variable resistor 130 (e.g., variable resistor $R_t$) and the capacitor 140 (e.g., capacitor $C_t$) charges the capacitor 140 (e.g., capacitor $C_t$). The voltage drop between two terminals of the capacitor 140 (e.g., capacitor $C_t$) is equal to the voltage at the node G minus the voltage at the node $T_2$. If the voltage drop between two terminals of the capacitor 140 (e.g., capacitor $C_t$) becomes less than a predetermined negative-direction voltage that is equal to a negative-direction threshold voltage (e.g., $V_{RD}$) multipIled by −1, the DIAC 120 becomes turned on and the TRIAC 110 is also turned on, so the voltage at the node $T_1$ and the voltage at the node $T_2$ become equal, causing the capacitor 140 (e.g., capacitor $C_t$) to discharge through the variable resistor 130 (e.g., variable resistor $R_t$). The negative-direction threshold voltage (e.g., $V_{RD}$) is larger than zero.

If the current that flows though the TRIAC 110 is larger than a holding current of the TRIAC 110, the TRIAC 110 remains turned on, and if the current that flows though the TRIAC 110 is smaller than the holding current of the TRIAC 110, the TRIAC 110 becomes turned off. Additionally, the variable resistor 130 (e.g., variable resistor $R_t$) is adjusted to change the time duration that is needed to charge or discharge the capacitor 140 (e.g., capacitor $C_t$), thus also changing the phase range within which the waveform of the AC input voltage 180 (e.g., VAC) is clipped by the TRIAC dimmer 100.

FIG. 2 is a simplified conventional diagram showing a current flowing through the TRIAC 110 as a function of the voltage drop between two terminals of the capacitor 140 as shown in FIG. 1. The current $I_T$ represents the current that flows through the TRIAC 110, and the voltage $V_{GT2}$ represents the voltage drop between two terminals of the capacitor 140, which is equal to the voltage at the node G minus the voltage at the node $T_2$. If the current $I_T$ is larger than zero, the current flows through the TRIAC 110 from the node $T_1$ to the node $T_2$, and if the current $I_T$ is smaller than zero, the current flows through the TRIAC 110 from the node $T_2$ to the node $T_1$. Also, if the voltage $V_{GT2}$ is larger than zero, the voltage at the node G is larger than the voltage at the node $T_2$, and if the voltage $V_{GT2}$ is smaller than zero, the voltage at the node G is smaller than the voltage at the node $T_2$. Additionally, $V_{BD}$ represents the positive-direction threshold voltage, and $V_{RD}$ represents the negative-direction threshold voltage.

As shown in FIG. 2, after the TRIAC 110 is turned on, if the current $I_T$ that flows though the TRIAC 110 is larger than the holding current (e.g., $I_H$) of the TRIAC 110, the TRIAC 110 remains turned on, and if the current that flows though the TRIAC 110 is smaller than the holding current of the TRIAC 110, the TRIAC 110 becomes turned off. Also as shown in FIG. 2, after the TRIAC 110 becomes turned off, if the current $I_T$ that flows though the TRIAC 110 is larger than the latching current (e.g., $I_L$) of the TRIAC 110, the TRIAC 110 becomes turned on, and if the current that flows though the TRIAC 110 is smaller than the latching current (e.g., $I_L$) of the TRIAC 110, the TRIAC 110 remains turned off. The latching current (e.g., $I_L$) of the TRIAC 110 is larger than the holding current (e.g., $I_H$) of the TRIAC 110.

As an example, the positive-direction threshold voltage $V_{BD}$ is not equal to the negative-direction threshold voltage $V_{RD}$, so given the same resistance value for the variable resistor $R_t$, the phase range within which the waveform of the AC input voltage VAC is clipped by the TRIAC dimmer 100 during the positive half cycle of the AC input voltage VAC is not equal to the phase range within which the waveform of the AC input voltage VAC is clipped by the TRIAC dimmer 100 during the negative half cycle of the AC input voltage VAC. For example, if the positive-direction threshold voltage $V_{BD}$ is significantly different from the negative-direction threshold voltage $V_{RD}$, the TRIAC dimmer 100 generates a waveform during the positive half cycle of the AC input voltage VAC and a waveform during the negative half cycle of the AC input voltage VAC, wherein the sizes of these two waveforms are significantly different, causing flickering of the one or more LEDs 190.

Hence it is highly desirable to improve the techniques related to LED lighting systems.

3. BRIEF SUMMARY OF THE INVENTION

Certain embodiments of the present invention are directed to circuits. More particularly, some embodiments of the invention provide systems and methods for controlling currents. Merely by way of example, some embodiments of the invention have been applled to light emitting diodes (LEDs). But it would be recognized that the invention has a much broader range of applicability.

According to some embodiments, a system for controlling one or more light emitting diodes includes: a phase detector configured to process information associated with a rectified voltage generated by a rectifier and related to a TRIAC dimmer, the rectified voltage corresponding to a first waveform during a first half cycle of an AC voltage and corresponding to a second waveform during a second half cycle of the AC voltage, the phase detector being further configured to generate a phase detection signal representing a first time duration during which the first waveform indicates that the rectified voltage is larger than a predetermined threshold and representing a second time duration during which the second waveform indicates that the rectified voltage is larger than the predetermined threshold; a mode detector configured to process information associated with the rectified voltage, determine whether the TRIAC dimmer is a leading-edge TRIAC dimmer or a trailing-edge TRIAC dimmer based on at least information associated with the rectified voltage, and generate a mode detection signal that indicates whether the TRIAC dimmer is the leading-edge TRIAC dimmer or the trailing-edge TRIAC dimmer; a modified signal generator configured to receive the phase detection signal from the phase detector and the mode detection signal from the mode detector, modify the phase detection signal based at least in part on the mode detection signal, and generate a modified signal representing a third time duration corresponding to the first half cycle of the AC voltage and a fourth time duration corresponding to the second half cycle of the AC voltage; and a current controller configured to receive the modified signal, the current controller being further configured to control, based at least in part of the modified signal, a first current flowing through one or more light emitting diodes configured to receive the rectified voltage; wherein: the first time duration and the second time duration are different in magnitude; and the third time duration and the fourth time duration are the same in magnitude.

According to certain embodiments, a system for controlling one or more light emitting diodes includes: a phase detector configured to process information associated with a rectified voltage generated by a rectifier and related to a TRIAC dimmer, the rectified voltage corresponding to a first waveform during a first half cycle of an AC voltage and corresponding to a second waveform during a second half cycle of the AC voltage, the signal detector being further configured to generate a phase detection signal representing a first time duration during which the first waveform indicates that the rectified voltage is larger than a predetermined threshold and representing a second time duration during which the second waveform indicates that the rectified voltage is larger than the predetermined threshold; a mode detector configured to process information associated with the rectified voltage, determine whether the TRIAC dimmer is a leading-edge TRIAC dimmer or a trailing-edge TRIAC dimmer based on at least information associated with the rectified voltage, and generate a mode detection signal that indicates whether the TRIAC dimmer is the leading-edge TRIAC dimmer or the trailing-edge TRIAC dimmer; and a modified signal generator configured to receive the phase detection signal from the phase detector and the mode detection signal from the mode detector, the modified signal generator being further configured to generate, based at least in part on the phase detection signal and the mode detection signal, a modified signal representing a third time duration corresponding to the first half cycle of the AC voltage and a fourth time duration corresponding to the second half cycle of the AC voltage; wherein: the first time duration is smaller than the second time duration in magnitude; the third time duration is equal to the first time duration in magnitude; the fourth time duration is smaller than the second duration in magnitude; and the third time duration and the fourth time duration are equal in magnitude.

According to some embodiments, a method for controlling one or more light emitting diodes includes: processing information associated with a rectified voltage related to a TRIAC dimmer, the rectified voltage corresponding to a first waveform during a first half cycle of an AC voltage and corresponding to a second waveform during a second half cycle of the AC voltage; generating a phase detection signal representing a first time duration during which the first waveform indicates that the rectified voltage is larger than a predetermined threshold and representing a second time duration during which the second waveform indicates that the rectified voltage is larger than the predetermined threshold; determining whether the TRIAC dimmer is a leading-edge TRIAC dimmer or a trailing-edge TRIAC dimmer based on at least information associated with the rectified voltage; generating a mode detection signal that indicates whether the TRIAC dimmer is the leading-edge TRIAC dimmer or the trailing-edge TRIAC dimmer; receiving the phase detection signal and the mode detection signal; modifying the phase detection signal based at least in part on the mode detection signal; generating a modified signal representing a third time duration corresponding to the first half cycle of the AC voltage and a fourth time duration corresponding to the second half cycle of the AC voltage; receiving the modified signal; and controlling, based at least in part of the modified signal, a first current flowing through one or more light emitting diodes configured to receive the rectified voltage; wherein: the first time duration and the second time duration are different in magnitude; and the third time duration and the fourth time duration are the same in magnitude.

According to certain embodiments, a method for controlling one or more light emitting diodes includes: processing information associated with a rectified voltage related to a TRIAC dimmer, the rectified voltage corresponding to a first waveform during a first half cycle of an AC voltage and corresponding to a second waveform during a second half cycle of the AC voltage; generating a phase detection signal representing a first time duration during which the first waveform indicates that the rectified voltage is larger than a predetermined threshold and representing a second time duration during which the second waveform indicates that the rectified voltage is larger than the predetermined threshold; determining whether the TRIAC dimmer is a leading-edge TRIAC dimmer or a trailing-edge TRIAC dimmer based on at least information associated with the rectified voltage; generating a mode detection signal that indicates whether the TRIAC dimmer is the leading-edge TRIAC dimmer or the trailing-edge TRIAC dimmer; receiving the phase detection signal and the mode detection signal; and generating, based at least in part on the phase detection signal and the mode detection signal, a modified signal representing a third time duration corresponding to the first half cycle of the AC voltage and a fourth time duration corresponding to the second half cycle of the AC voltage; wherein: the first time duration is smaller than the second time duration in magnitude; the third time duration is equal to the first time duration in magnitude; the fourth time duration is smaller than the second duration in magnitude; and the third time duration and the fourth time duration are equal in magnitude.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

Certain embodiments of the present invention are directed to circuits. More particularly, some embodiments of the invention provide systems and methods for controlling currents. Merely by way of example, some embodiments of the invention have been applled to light emitting diodes (LEDs). But it would be recognized that the invention has a much broader range of applicability.

Figure 1:
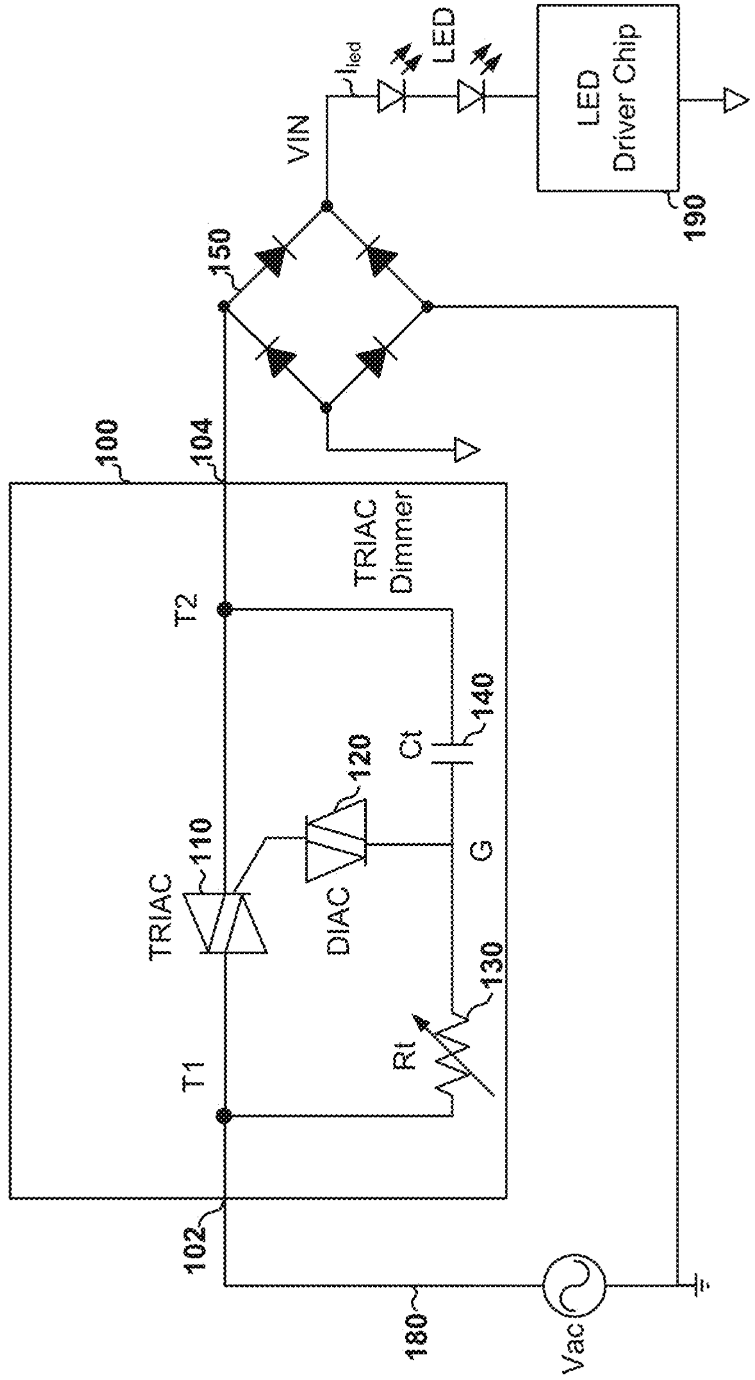
FIG. 1 (Prior Art)
FIG. 1 is a simplified diagram showing a conventional TRIAC dimmer.
Figure 2:
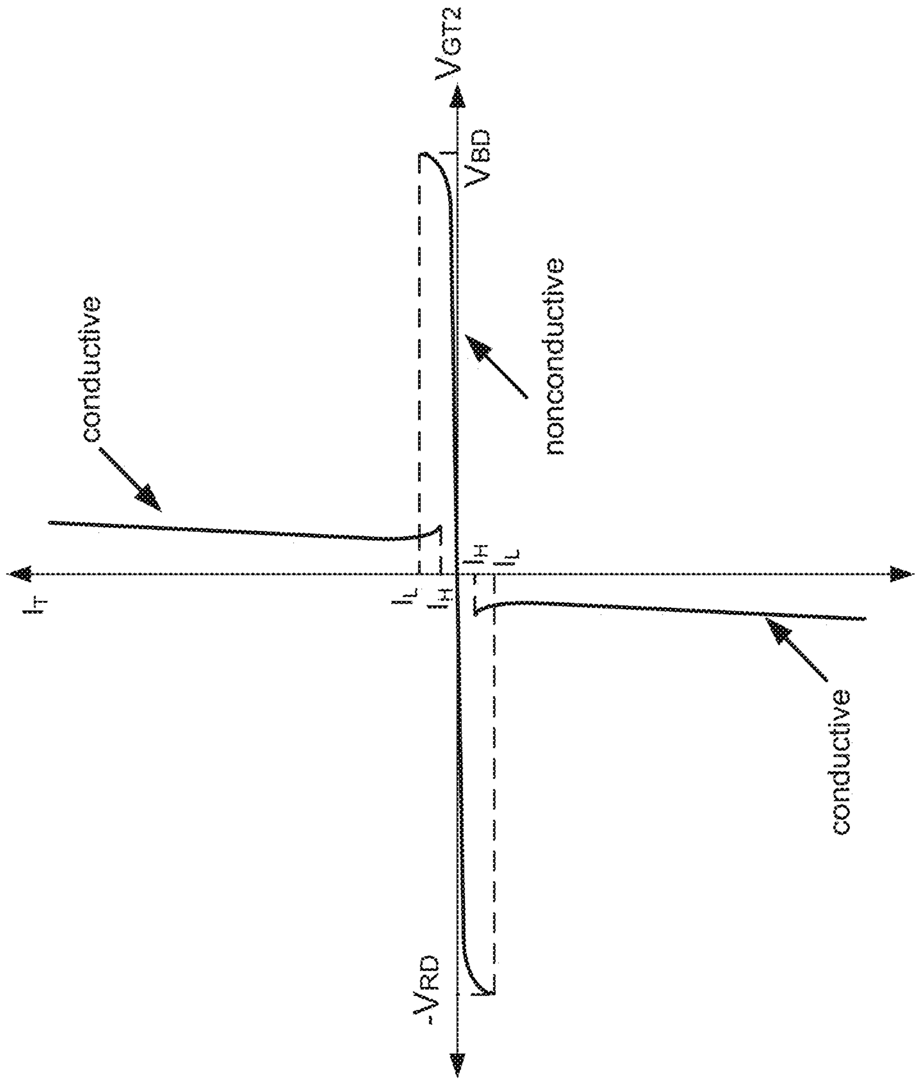
FIG. 2 (Prior Art)
FIG. 2 is a simplified conventional diagram showing a current flowing through the TRIAC as a function of the voltage drop between two terminals of the capacitor as shown in FIG. 1.
Figure 3:
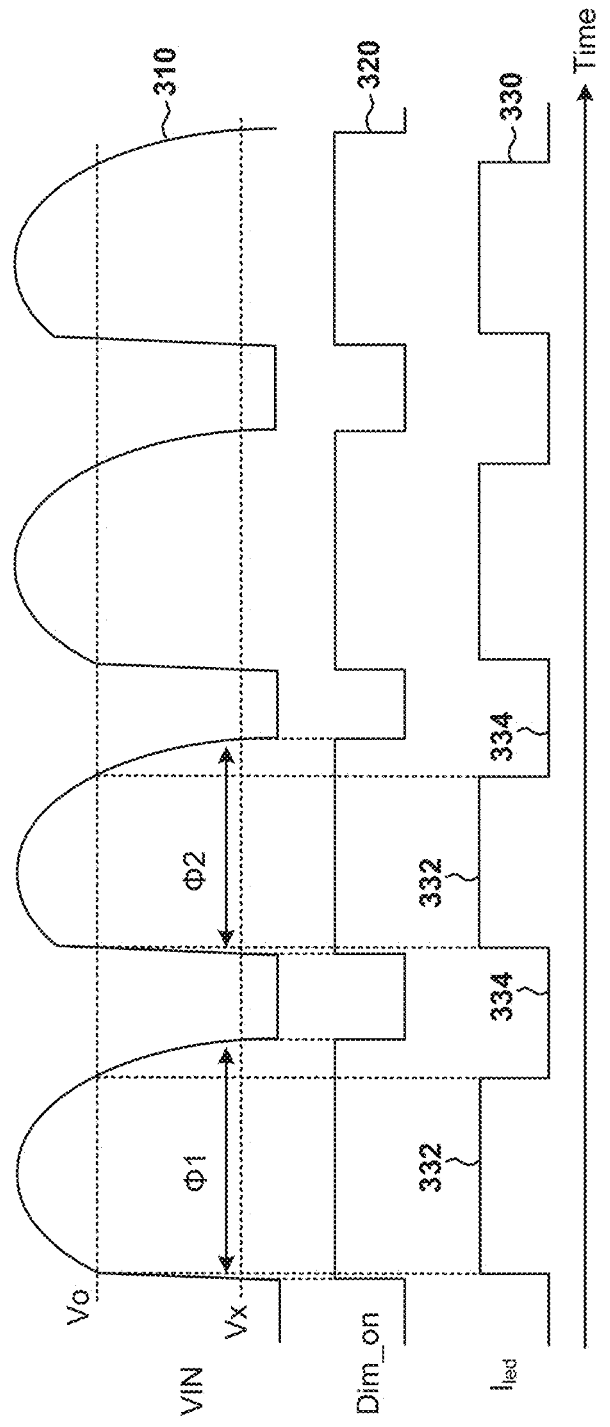
FIG. 3 shows simplified timing diagrams related to the TRIAC dimmer as shown in FIG. 1 according to some embodiments.

FIG. 3 shows simplified timing diagrams related to the TRIAC dimmer 100 as shown in FIG. 1 according to some embodiments. These diagrams are merely examples, which should not unduly limit the scope of the claims. One of ordinary skill in the art would recognize many variations, alternatives, and modifications. As shown in FIG. 3, the waveform 310 represents the rectified voltage (e.g., VIN) as a function of time, the waveform 320 represents the logic signal (e.g., Dim_on) that represents size of waveform for the rectified voltage as a function of time, and the waveform 330 represents the output current (e.g., $I_{led}$) flowing through the one or more LEDs as a function of time. For example, the logic signal (e.g., Dim_on) is an internal signal generated by the LED driver chip 190.

As shown by the waveforms 310 and 320, if the rectified voltage VIN is larger than a threshold voltage $V_x$, the logic signal Dim_on is at a logic high level, and if the rectified voltage VIN is smaller than the threshold voltage $V_x$, the logic signal Dim_on is at a logic low level according to certain embodiments. As an example, the threshold voltage $V_x$ is equal to a predetermined voltage value that is selected from a range from 10 volts to 30 volts. For example, during a positive half cycle of the AC input voltage VAC, the logic signal Dim_on remains at the logic high level during a time duration that corresponds to a phase range $\phi_1$. As an example, during a negative half cycle of the AC input voltage VAC, the logic signal Dim_on remains at the logic high level during a time duration that corresponds to a phase range $\phi_2$. As shown in FIG. 3, the phase range $\phi_1$ and the phase range $\phi_2$ are not equal, indicating the size of the waveform during the positive half cycle of the AC input voltage VAC and the size of the waveform during the negative half cycle of the AC input voltage VAC are different according to some embodiments.

As shown by the waveforms 310 and 330, if the rectified voltage VIN is larger than a threshold voltage $V_o$, the output current (e.g., $I_{led}$) is at a high current level 332, and if the rectified voltage VIN is smaller than the threshold voltage $V_o$, the output current (e.g., $I_{led}$) is at a low current level 334 (e.g., zero) according to some embodiments. As an example, the threshold voltage $V_o$ is higher than the threshold voltage $V_x$. For example, in the positive half cycle of the AC input voltage VAC, the time duration during which the output current (e.g., $I_{led}$) is at the current level 332 can be determined by the time duration during which the logic signal Dim_on is at the logic high level, so the time duration during which the logic signal Dim_on is at the logic high level is used to represent the time duration during which the output current (e.g., $I_{led}$) is at the current level 332. As an example, in the negative half cycle of the AC input voltage VAC, the time duration during which the output current (e.g., $I_{led}$) is at the current level 332 can be determined by the time duration during which the logic signal Dim_on is at the logic high level, so the time duration during which the logic signal Dim_on is at the logic high level is used to represent the time duration during which the output current (e.g., $I_{led}$) is at the current level 332.

In some examples, the phase range $\phi_1$ and the phase range $\phi_2$ are not equal, so the time duration during which the output current (e.g., $I_{led}$) is at the current level 332 in the positive half cycle of the AC input voltage VAC and the time duration during which the output current (e.g., $I_{led}$) is at the current level 332 in the negative half cycle of the AC input voltage VAC are also different, causing the average of the output current (e.g., $I_{led}$) in the positive half cycle of the AC input voltage VAC and the average of the output current (e.g., $I_{led}$) in the negative half cycle of the AC input voltage VAC to be different. In certain examples, if the average of the output current (e.g., $I_{led}$) in the positive half cycle of the AC input voltage VAC and the average of the output current (e.g., $I_{led}$) in the negative half cycle of the AC input voltage VAC are significantly different, human eyes can perceive flickering of the one or more LEDs.

Figure 4:
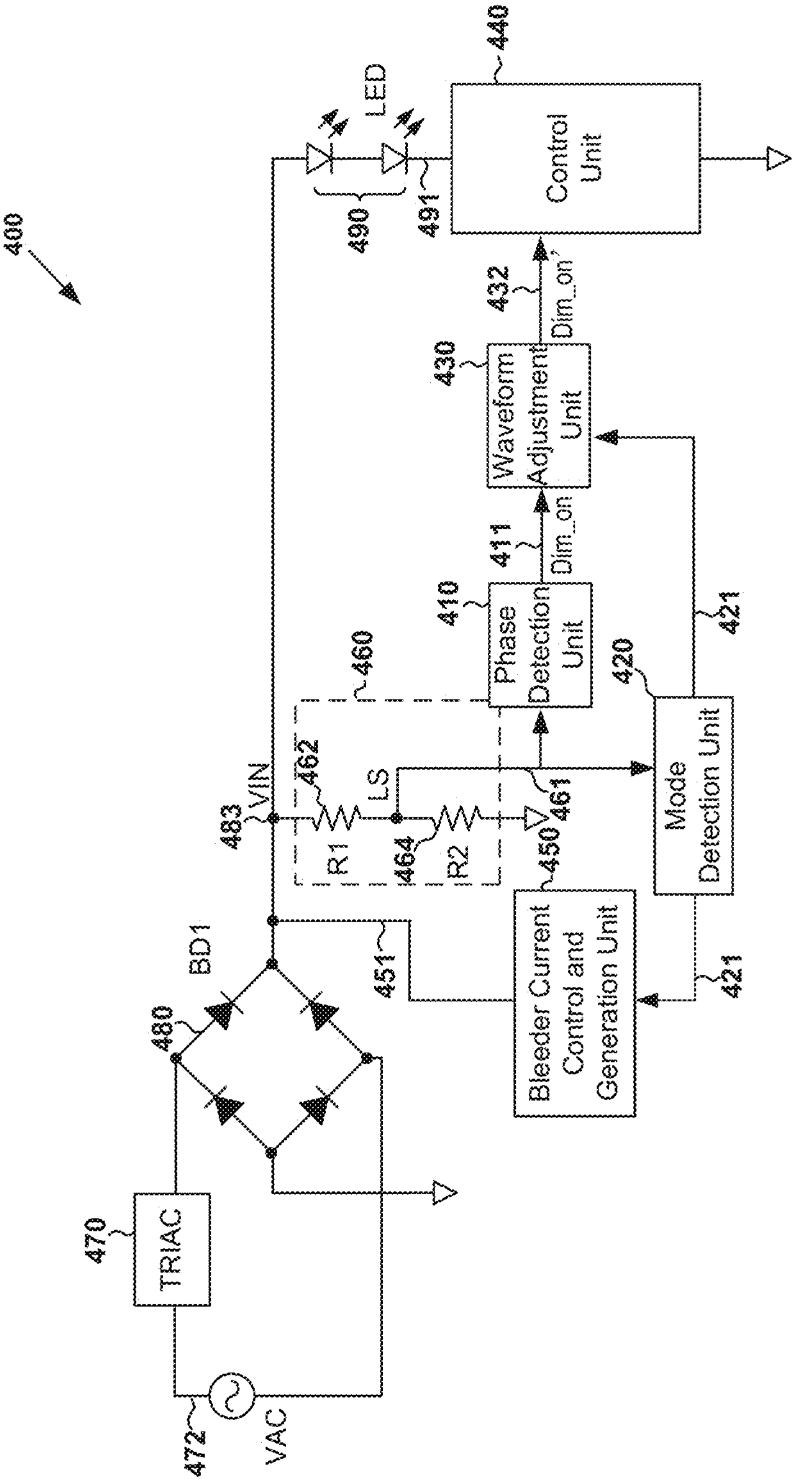
FIG. 4 is a simplified diagram showing an LED lighting system according to certain embodiments of the present invention.

FIG. 4 is a simplified diagram showing an LED lighting system according to certain embodiments of the present invention. This diagram is merely an example, which should not unduly limit the scope of the claims. One of ordinary skill in the art would recognize many variations, alternatives, and modifications. As shown in FIG. 4, the LED lighting system 400 includes a TRIAC dimmer 470, a rectifier 480 (e.g., BD1), one or more LEDs 490, a bleeder current control and generation unit 450, a voltage detection unit 460, a phase detection unit 410, a mode detection unit 420, a waveform adjustment unit 430, and a control unit 440 for LED output current according to certain embodiments. For example, the rectifier 480 (e.g., BD1) includes a bridge rectifier circuit. As an example, the bleeder current control and generation unit 450, the phase detection unit 410, the mode detection unit 420, the waveform adjustment unit 430, and the control unit 440 for LED output current are on the same chip, but the voltage detection unit 460 is not on the same chip. For example, the bleeder current control and generation unit 450, the phase detection unit 410, the mode detection unit 420, the waveform adjustment unit 430, the control unit 440 for LED output current, and the voltage detection unit 460 are on the same chip. Although the above has been shown using a selected group of components for the LED lighting system, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In some embodiments, after the system 400 is powered on, an alternating current (AC) input voltage 472 (e.g., VAC) is received by the TRIAC dimmer 470 and rectified by the rectifier 480 (e.g., BD1) to generate a rectified voltage 483 (e.g., VIN). For example, the rectified voltage 483 (e.g., VIN) is used to control an output current 491 that flows through the one or more LEDs 490. In certain embodiments, the rectified voltage 483 (e.g., VIN) is received by the voltage detection unit 460, which in response outputs a sensing signal 461 (e.g., LS) to the phase detection unit 410 and the mode detection unit 420. For example, the voltage detection unit 460 includes a resistor 462 (e.g., R1) and a resistor 464 (e.g., R2), and the resistors 462 and 464 form a voltage divider. As an example, the resistor 462 (e.g., R1) and the resistor 464 (e.g., R2) are in series and are biased between the rectified voltage 483 (e.g., VIN) and a ground voltage.

According to certain embodiments, the mode detection unit 420 receives the sensing signal 461 (e.g., LS), determines whether the TRIAC dimmer 470 is a leading-edge TRIAC dimmer or a trailing-edge TRIAC dimmer based at least in part on the sensing signal 461 (e.g., LS), generates a mode signal 421 that indicates whether the TRIAC dimmer 470 is a leading-edge TRIAC dimmer or a trailing-edge TRIAC dimmer, and output the mode signal 421 to the bleeder current control and generation unit 450 and the waveform adjustment unit 430. For example, the mode detection unit 420 generates the mode signal 421 based at least in part on the sensing signal 461 (e.g., LS). According to some embodiments, the bleeder current control and generation unit 450 receives the mode signal 421 and generates a bleeder current 451 based at least in part on the mode signal 421. As an example, the bleeder current 451 is used to ensure that the current flowing through the TRIAC dimmer 470 does not fall below a holding current of the TRIAC dimmer 470 in order to maintain normal operation of the TRIAC dimmer 470.

In some embodiments, the phase detection unit 410 receives the sensing signal 461 (e.g., LS), generates a logic signal 411 (e.g., Dim_on) based at least in part on the sensing signal 461 (e.g., LS), and outputs the logic signal 411 (e.g., Dim_on) to the waveform adjustment unit 430. For example, if the sensing signal 461 (e.g., LS) is larger than a threshold signal, the logic signal 411 (e.g., Dim_on) is at a logic high level. As an example, if the sensing signal 461 (e.g., LS) is smaller than the threshold signal, the logic signal 411 (e.g., Dim_on) is at a logic low level.

In certain embodiments, the waveform adjustment unit 430 receives the logic signal 411 (e.g., Dim_on) and the mode signal 421, generates a logic signal 432 (e.g., Dim_on') by modifying the logic signal 411 (e.g., Dim_on) based at least in part on the mode signal 421, and outputs the logic signal 432 (e.g., Dim_on') to the control unit 440 for LED output current. For example, the logic signal 411 (e.g., Dim_on) is modified based at least in part on the mode signal 421 in order to eliminate the effect of different sizes of the waveforms of the rectified voltage 483 (e.g., VIN) during the positive half cycle of the AC input voltage 472 (e.g., VAC) and during the negative half cycle of the AC input voltage 472 (e.g., VAC).

According to certain embodiments, the control unit 440 for LED output current receives the logic signal 432 (e.g., Dim_on') and uses the logic signal 432 (e.g., Dim_on') to control the output current 491 that flows through the one or more LEDs 490. For example, the control unit 440 for LED output current includes three terminals, one terminal of which is configured to receive the logic signal 432 (e.g., Dim_on'), another terminal of which is biased to the ground voltage, and yet another terminal of which is connected to one terminal of the one or more LEDs 490. As an example, the one or more LEDs 490 includes another terminal configured to receive the rectified voltage 483 (e.g., VIN).

Figure 5:
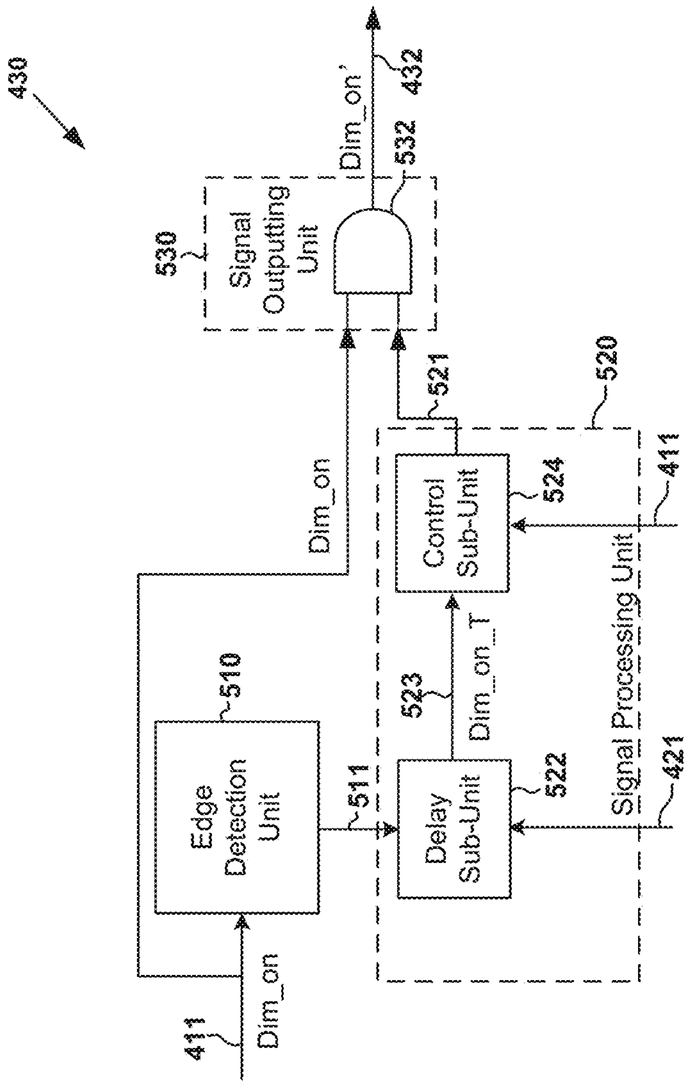
FIG. 5 is a simplified diagram showing certain components of the waveform adjustment unit as part of the LED lighting system as shown in FIG. 4 according to some embodiments of the present invention.

FIG. 5 is a simplified diagram showing certain components of the waveform adjustment unit 430 as part of the LED lighting system 400 as shown in FIG. 4 according to some embodiments of the present invention. This diagram is merely an example, which should not unduly limit the scope of the claims. One of ordinary skill in the art would recognize many variations, alternatives, and modifications. As shown in FIG. 5, the waveform adjustment unit 430 includes an edge detection unit 510, a signal processing unit 520, and a signal outputting unit 530 according to certain embodiments. For example, the signal processing unit 520 includes a delay sub-unit 522 and a control sub-unit 524. Although the above has been shown using a selected group of components for the waveform adjustment unit, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In certain embodiments, the edge detection unit 510 receives the logic signal 411 (e.g., Dim_on), detects a rising edge or a falling edge of the logic signal 411 (e.g., Dim_on), generate a detection signal 511 indicating the occurrence of the rising edge or the falling edge of the logic signal 411 (e.g., Dim_on), and output the detection signal 511 to the signal processing unit 520. For example, if the edge detection unit 510 detects a rising edge of the logic signal 411 (e.g., Dim_on), the edge detection unit 510 generates the detection signal 511 to indicate the occurrence of the rising edge of the logic signal 411 (e.g., Dim_on). As an example, if the edge detection unit 510 detects a falling edge of the logic signal 411 (e.g., Dim_on), the edge detection unit 510 generates the detection signal 511 to indicate the occurrence of the falling edge of the logic signal 411 (e.g., Dim_on). In some examples, the detection signal 511 indicates whether a change of the logic signal 411 (e.g., Dim_on) has occurred and also indicates whether the change of the logic signal 411 (e.g., Dim_on) corresponds to a rising edge of the logic signal 411 (e.g., Dim_on) or a falling edge of the logic signal 411 (e.g., Dim_on).

In some embodiments, the signal processing unit 520 receives the detection signal 511, the mode signal 421, and the logic signal 411 (e.g., Dim_on), generates a control signal 521 based at least in part on the detection signal 511, the mode signal 421, and the logic signal 411 (e.g., Dim_on), and outputs the control signal 521 to the signal outputting unit 530. For example, the signal processing unit 520 includes the delay sub-unit 522 and the control sub-unit 524.

According to certain embodiments, the delay sub-unit 522 receives the detection signal 511 and the mode signal 421, generates a delayed signal 523 (e.g., Dim_on_T) based at least in part on the detection signal 511 and the mode signal 421, and outputs the delayed signal 523 to the control sub-unit 524. In some examples, if the mode signal 421 indicates that the TRIAC dimmer 470 is a leading-edge TRIAC dimmer, the delay sub-unit 522 generates the delayed signal 523 (e.g., Dim_on_T) by delaying, by a predetermined delay of time, the rising edge of the logic signal 411 (e.g., Dim_on) as indicated by the detection signal 511. In certain examples, if the mode signal 421 indicates that the TRIAC dimmer 470 is a trailing-edge TRIAC dimmer, the delay sub-unit 522 generates the delayed signal 523 (e.g., Dim_on_T) by delaying, by the predetermined delay of time, the falling edge of the logic signal 411 (e.g., Dim_on) as indicated by the detection signal 511. For example, the predetermined delay of time is equal to a half cycle of the AC input voltage 472 (e.g., VAC) in time duration.

According to some embodiments, the control sub-unit 524 receives the delayed signal 523 and the logic signal 411 (e.g., Dim_on), generates the control signal 521 based at least in part on the delayed signal 523 and the logic signal 411 (e.g., Dim_on), and outputs the control signal 521 to the signal outputting unit 530. In certain examples, the control signal 521 is the same as the delayed signal 523, except that during the first half cycle of the AC input voltage 472 (e.g., VAC), the control signal 521 is the same as the logic signal 411 (e.g., Dim_on). For example, the first half cycle of the AC input voltage 472 (e.g., VAC) is either a positive half cycle or a negative half cycle of the AC input voltage 472 (e.g., VAC). As an example, the first half cycle of the AC input voltage 472 (e.g., VAC) occurs immediately after the system 400 is powered on.

In certain embodiments, the signal outputting unit 530 receives the control signal 521 and the logic signal 411 (e.g., Dim_on), generates the logic signal 432 (e.g., Dim_on') based at least in part on the control signal 521 and the logic signal 411 (e.g., Dim_on), and outputs the logic signal 432 (e.g., Dim_on') to the control unit 440 for LED output current. For example, the signal outputting unit 530 includes an AND gate 532. As an example, the AND gate 532 receives the control signal 521 and the logic signal 411 (e.g., Dim_on) and generates the logic signal 432 (e.g., Dim_on').

As discussed above and further emphasized here, FIG. 5 is merely an example, which should not unduly limit the scope of the claims. One of ordinary skill in the art would recognize many variations, alternatives, and modifications. In some examples, the edge detection unit 510 is removed from the waveform adjustment unit 430, and the signal processing unit 520 receives the logic signal 411 (e.g., Dim_on) instead of the detection signal 511 and generates the control signal 521 based at least in part on the logic signal 411 (e.g., Dim_on) and the mode signal 421. For example, the logic signal 411 (e.g., Dim_on) indicates whether a change of the logic signal 411 (e.g., Dim_on) has occurred and also indicates whether the change of the logic signal 411 (e.g., Dim_on) corresponds to a rising edge of the logic signal 411 (e.g., Dim_on) or a falling edge of the logic signal 411 (e.g., Dim_on). As an example, the delay sub-unit 522 receives the logic signal 411 (e.g., Dim_on) instead of the detection signal 511 and generates the delayed signal 523 (e.g., Dim_on_T) based at least in part on the logic signal 411 (e.g., Dim_on) and the mode signal 421.

Figure 6:
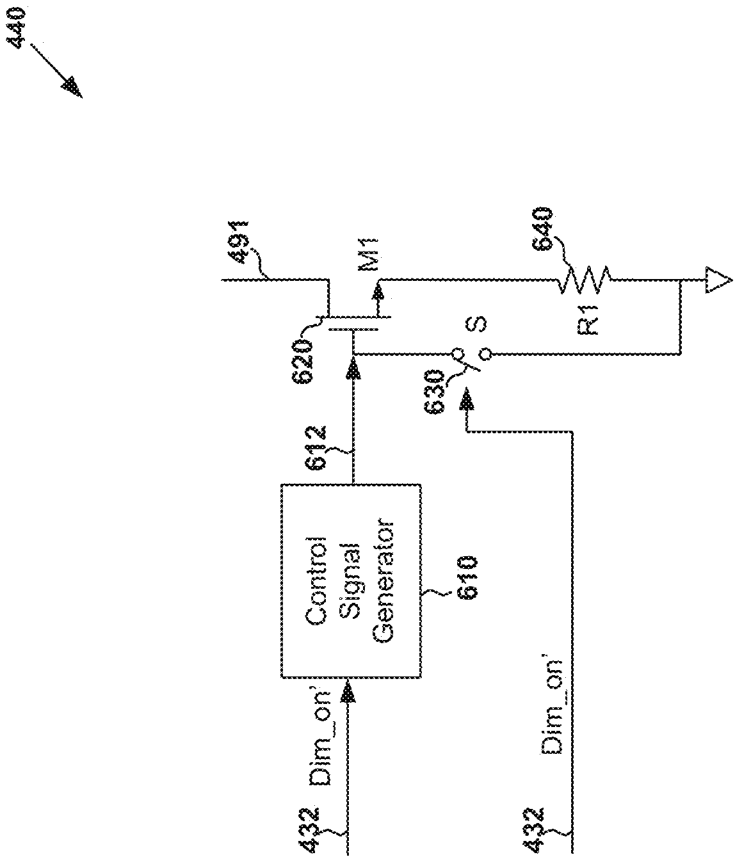
FIG. 6 is a simplified diagram showing certain components of the control unit for LED output current as part of the LED lighting system as shown in FIG. 4 according to certain embodiments of the present invention.

FIG. 6 is a simplified diagram showing certain components of the control unit 440 for LED output current as part of the LED lighting system 400 as shown in FIG. 4 according to certain embodiments of the present invention. This diagram is merely an example, which should not unduly limit the scope of the claims. One of ordinary skill in the art would recognize many variations, alternatives, and modifications. As shown in FIG. 6, the control unit 440 for LED output current includes a control signal generator 610, a transistor 620, a switch 630 and a resistor 640. Although the above has been shown using a selected group of components for the control unit, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In some embodiments, the control signal generator 610 receives the logic signal 432 (e.g., Dim_on'), generates a control signal 612 based at least in part on the logic signal 432 (e.g., Dim_on'), and outputs the control signal 612 to a gate terminal of the transistor 620. In certain examples, the transistor 620 includes the gate terminal, a drain terminal, and a source terminal. For example, the drain terminal of the transistor 620 is connected to one terminal of the one or more LEDs 490. As an example, the source terminal of the transistor 620 is connected to a terminal of the resistor 640, which also includes another terminal biased to the ground voltage. In certain embodiments, the gate terminal of the transistor 620 is also connected to a terminal of the switch 630, which also includes another terminal biased to the ground voltage. In some examples, the switch 630 receives the logic signal 432 (e.g., Dim_on'). For example, if the logic signal 432 (e.g., Dim_on') is at the logic high level, the switch 630 is open. As an example, if the logic signal 432 (e.g., Dim_on') is at the logic low level, the switch 630 is closed.

According to some embodiments, if the logic signal 432 (e.g., Dim_on') is at the logic low level, the switch 630 is closed, so that the gate terminal of the transistor 620 is biased to the ground voltage. For example, if the gate terminal of the transistor 620 is biased to the ground voltage, the transistor 620 is turned off so that the output current 491 that flows through the one or more LEDs 490 is not allowed to be generated (e.g., the output current 491 being equal to zero).

According to certain embodiments, if the logic signal 432 (e.g., Dim_on') is at the logic high level, the switch 630 is open, so that the voltage of the gate terminal of the transistor 620 is controlled by the control signal 612. For example, the control signal 612 is generated by the control signal generator 610 based at least in part on the logic signal 432 (e.g., Dim_on'). As an example, the control signal 612 is generated at a constant voltage level, and the constant voltage level of the control signal 612 is used by the transistor 620 to generate the output current 491 at a constant current level for a time duration during which the rectified voltage 483 (e.g., VIN) exceeds a threshold voltage that is needed to provide the forward bias voltage for the one or more LEDs 490.

Figure 7:
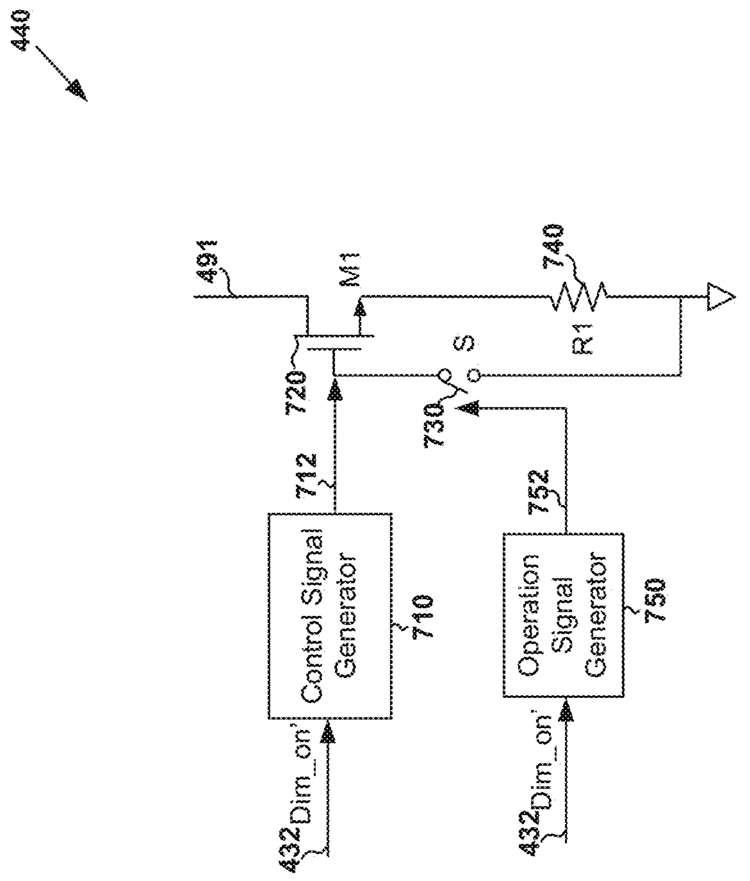
FIG. 7 is a simplified diagram showing certain components of the control unit for LED output current as part of the LED lighting system as shown in FIG. 4 according to some embodiments of the present invention.

FIG. 7 is a simplified diagram showing certain components of the control unit 440 for LED output current as part of the LED lighting system 400 as shown in FIG. 4 according to some embodiments of the present invention. This diagram is merely an example, which should not unduly limit the scope of the claims. One of ordinary skill in the art would recognize many variations, alternatives, and modifications. As shown in FIG. 7, the control unit 440 for LED output current includes a control signal generator 710, a transistor 720, a switch 730, a resistor 740, and an operation signal generator 750. Although the above has been shown using a selected group of components for the control unit, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In some embodiments, the control signal generator 710 receives the logic signal 432 (e.g., Dim_on'), generates a control signal 712 (e.g., a drive signal) based at least in part on the logic signal 432 (e.g., Dim_on'), and outputs the control signal 712 to a gate terminal of the transistor 720. In certain examples, the transistor 720 includes the gate terminal, a drain terminal, and a source terminal. For example, the drain terminal of the transistor 720 is connected to one terminal of the one or more LEDs 490. As an example, the source terminal of the transistor 620 is connected to a terminal of the resistor 740, which also includes another terminal biased to the ground voltage. In certain embodiments, the gate terminal of the transistor 720 is also connected to a terminal of the switch 730, which also includes another terminal biased to the ground voltage. In some examples, the switch 730 receives an operation signal 752. For example, if the operation signal 752 is at the logic high level, the switch 730 is open. As an example, if the operation signal 752 is at the logic low level, the switch 730 is closed.

According to certain embodiments, the operation signal generator 750 receives the logic signal 432 (e.g., Dim_on'), generates the operation signal 752 based at least in part on the logic signal 432 (e.g., Dim_on'), and outputs the operation signal 752 to the switch 730. In some examples, the operation signal generator 750 includes a buffer. In certain examples, when the logic signal 432 (e.g., Dim_on') changes from the logic low level to the logic high level, the operation signal 752 also changes from the logic low level to the logic high level. For example, before the logic signal 432 (e.g., Dim_on') changes from the logic high level to the logic low level, the operation signal 752 changes from the logic high level to the logic low level. As an example, when the logic signal 432 (e.g., Dim_on') changes from the logic high level to the logic low level, the operation signal 752 changes from the logic high level to the logic low level. For example, after the logic signal 432 (e.g., Dim_on') changes from the logic high level to the logic low level, the operation signal 752 changes from the logic high level to the logic low level.

In some embodiments, if the operation signal 752 is at the logic low level, the switch 730 is closed, so that the gate terminal of the transistor 720 is biased to the ground voltage. For example, if the gate terminal of the transistor 720 is biased to the ground voltage, the transistor 720 is turned off so that the output current 491 that flows through the one or more LEDs 490 is not allowed to be generated (e.g., the output current 491 being equal to zero). In certain embodiments, if the operation signal 752 is at the logic high level, the switch 730 is open, so that the voltage of the gate terminal of the transistor 720 is controlled by the control signal 712. For example, the control signal 712 is generated by the control signal generator 710 based at least in part on the logic signal 432 (e.g., Dim_on'). As an example, the control signal 712 is generated at a constant voltage level, and the constant voltage level of the control signal 712 is used by the transistor 720 to generate the output current 491 at a constant current level. For example, the constant current level of the output current 491 is determined at least in part by the constant voltage level of the control signal 712.

Figure 8:
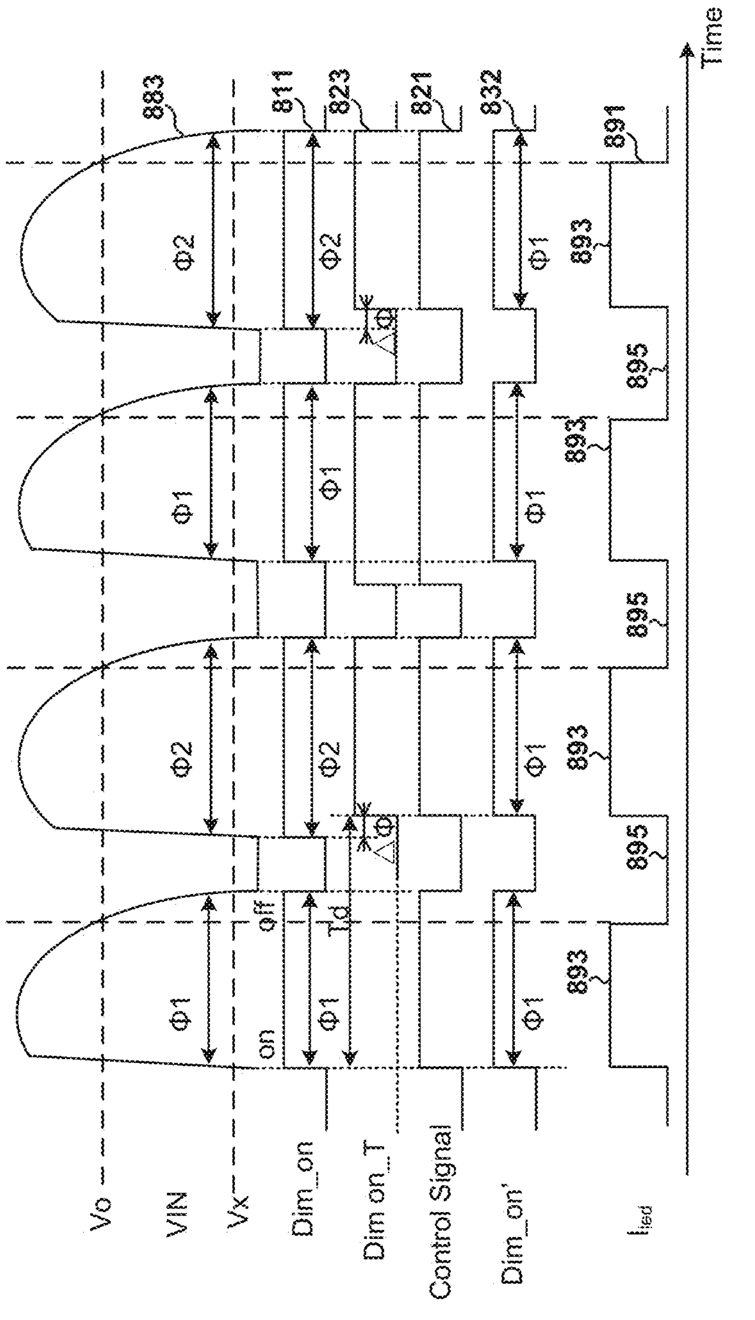
FIG. 8 shows simplified timing diagrams for the LED lighting system if the TRIAC dimmer is a leading-edge TRIAC dimmer as shown in FIG. 4, FIG. 5 and FIG. 6 according to some embodiments of the present invention.

FIG. 8 shows simplified timing diagrams for the LED lighting system 400 if the TRIAC dimmer 470 is a leading-edge TRIAC dimmer as shown in FIG. 4, FIG. 5 and FIG. 6 according to some embodiments of the present invention. These diagrams are merely examples, which should not unduly limit the scope of the claims. One of ordinary skill in the art would recognize many variations, alternatives, and modifications. As shown in FIG. 8, the waveform 883 represents the rectified voltage 483 (e.g., VIN) as a function of time, the waveform 811 represents the logic signal 411 (e.g., Dim_on) as a function of time, the waveform 823 represents the delayed signal 523 (e.g., Dim_on_T) as a function of time, the waveform 821 represents the control signal 521 as a function of time, the waveform 832 represents the logic signal 432 (e.g., Dim_on') as a function of time, and the waveform 891 represents the output current 491 (e.g., $I_{led}$) that flows through the one or more LEDs 490 as a function of time.

As shown by the waveforms 883 and 811, if the rectified voltage 483 (e.g., VIN) is larger than a threshold voltage $V_x$, the logic signal 411 (e.g., Dim_on) is at a logic high level, and if the rectified voltage 483 (e.g., VIN) is smaller than the threshold voltage $V_x$, the logic signal 411 (e.g., Dim_on) is at a logic low level according to certain embodiments. As an example, the threshold voltage $V_x$ is equal to a predetermined voltage value that is selected from a range from 10 volts to 30 volts. For example, during a negative half cycle of the AC input voltage 472 (e.g., VAC), the logic signal 411 (e.g., Dim_on) remains at the logic high level during a time duration that corresponds to a phase range $\phi_1$. As an example, during a positive half cycle of the AC input voltage 472 (e.g., VAC), the logic signal 411 (e.g., Dim_on) remains at the logic high level during a time duration that corresponds to a phase range $\phi_2$. As shown in FIG. 8, the phase range $\phi_1$ and the phase range $\phi_2$ are not equal, indicating the size of the waveform during the negative half cycle of the AC input voltage 472 (e.g., VAC) and the size of the waveform during the positive half cycle of the AC input voltage 472 (e.g., VAC) are different according to some embodiments.

As shown by the waveforms 811 and 823, if the mode signal 421 indicates that the TRIAC dimmer 470 is a leading-edge TRIAC dimmer, the delayed signal 523 (e.g., Dim_on_T) is generated by delaying, by a predetermined delay of time (e.g., $T_d$), a rising edge of the logic signal 411 (e.g., Dim_on) according to some embodiments. For example, the predetermined delay of time (e.g., $T_d$) is equal to a half cycle of the AC input voltage 472 (e.g., VAC) in time duration. As an example, the phase range $\phi_2$ is larger than the phase range $\phi_1$, and the phase range $\phi_2$ minus the phase range $\phi_1$ is equal to $\Delta\phi$. As shown by the waveforms 811, 823 and 821, the control signal 521 is the same as the delayed signal 523, except that during the first half cycle of the AC input voltage 472 (e.g., VAC), the control signal 521 is the same as the logic signal 411 (e.g., Dim_on), according to certain embodiments.

As shown by the waveforms 811, 821 and 832, if the logic signal 411 (e.g., Dim_on) or the control signal 521 is at the logic low level, the logic signal 432 (e.g., Dim_on') is at the logic low level, and if the logic signal 411 (e.g., Dim_on) and the control signal 521 both are at the logic high level, the logic signal 432 (e.g., Dim_on') is at the logic high level, according to some embodiments. For example, if the logic signal 411 (e.g., Dim_on) and the control signal 521 both are at the logic low level, the logic signal 432 (e.g., Dim_on') is at the logic low level. In certain examples, the pulse width of the logic signal 432 (e.g., Dim_on') during a negative half cycle of the AC input voltage 472 (e.g., VAC) is equal to the pulse width of the logic signal 432 (e.g., Dim_on') during a positive half cycle of the AC input voltage 472 (e.g., VAC). As an example, during the negative half cycle of the AC input voltage 472 (e.g., VAC), the pulse width of the logic signal 432 (e.g., Dim_on') corresponds to the phase range $\phi_1$, and during the positive half cycle of the AC input voltage 472 (e.g., VAC), the pulse width of the logic signal 432 (e.g., Dim_on') also corresponds to the phase range $\phi_1$.

As shown by the waveforms 832 and 891, the logic signal 432 (e.g., Dim_on') is used to generate the output current 491 (e.g., $I_{led}$) according to certain embodiments. In some examples, the output current 491 (e.g., $I_{led}$) alternates between a high current level 893 and a low current level 895 (e.g. zero) to form one or more pulses at which the output current 491 (e.g., $I_{led}$) remains at the high current level 893. For example, when the logic signal 432 (e.g., Dim_on') changes from the logic low level to the logic high level, the output current 491 (e.g., $I_{led}$) changes from the low current level 895 (e.g. zero) to the high current level 893. As an example, a predetermined period of time before the logic signal 432 (e.g., Dim_on') changes from the logic high level to the logic low level, the output current 491 (e.g., $I_{led}$) changes from the high current level 893 to the low current level 895 (e.g. zero). For example, the output current 491 (e.g., $I_{led}$) changes from the high current level 893 to the low current level 895 (e.g. zero) when the rectified voltage 483 (e.g., VIN) changes from being larger than a threshold voltage $V_o$ to being smaller than the threshold voltage $V_o$. As an example, the threshold voltage $V_o$ is higher than the threshold voltage $V_x$. In certain examples, the pulse width of the output current 491 (e.g., $I_{led}$) during a negative half cycle of the AC input voltage 472 (e.g., VAC) is equal to the pulse width of the output current 491 (e.g., $I_{led}$) during a positive half cycle of the AC input voltage 472 (e.g., VAC). For example, the time duration during which the output current 491 (e.g., $I_{led}$) is at the current level 893 in the negative half cycle of the AC input voltage 472 (e.g., VAC) and the time duration during which the output current 491 (e.g., $I_{led}$) is at the current level 893 in the positive half cycle of the AC input voltage 472 (e.g., VAC) are the same. As an example, the average of the output current 491 (e.g., $I_{led}$) in the negative half cycle of the AC input voltage 472 (e.g., VAC) and the average of the output current 491 (e.g., $I_{led}$) in the positive half cycle of the AC input voltage 472 (e.g., VAC) are equal, preventing flickering of the one or more LEDs 490.

Figure 9:
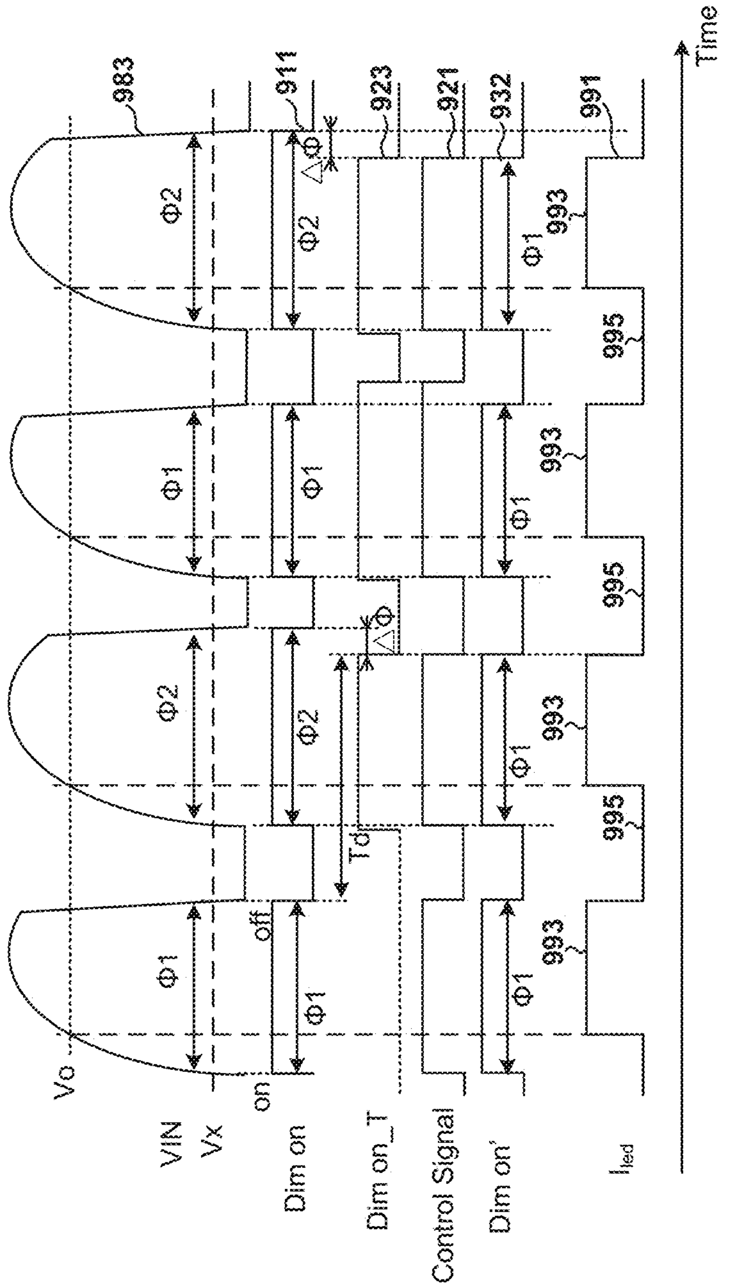
FIG. 9 shows simplified timing diagrams for the LED lighting system if the TRIAC dimmer is a trailing-edge TRIAC dimmer as shown in FIG. 4, FIG. 5 and FIG. 6 according to certain embodiments of the present invention.

FIG. 9 shows simplified timing diagrams for the LED lighting system 400 if the TRIAC dimmer 470 is a trailing-edge TRIAC dimmer as shown in FIG. 4, FIG. 5 and FIG. 6 according to certain embodiments of the present invention. These diagrams are merely examples, which should not unduly limit the scope of the claims. One of ordinary skill in the art would recognize many variations, alternatives, and modifications. As shown in FIG. 9, the waveform 983 represents the rectified voltage 483 (e.g., VIN) as a function of time, the waveform 911 represents the logic signal 411 (e.g., Dim_on) as a function of time, the waveform 923 represents the delayed signal 523 (e.g., Dim_on_T) as a function of time, the waveform 921 represents the control signal 521 as a function of time, the waveform 932 represents the logic signal 432 (e.g., Dim_on') as a function of time, and the waveform 991 represents the output current 491 (e.g., $I_{led}$) that flows through the one or more LEDs 490 as a function of time.

As shown by the waveforms 983 and 911, if the rectified voltage 483 (e.g., VIN) is larger than a threshold voltage $V_x$, the logic signal 411 (e.g., Dim_on) is at a logic high level, and if the rectified voltage 483 (e.g., VIN) is smaller than the threshold voltage $V_x$, the logic signal 411 (e.g., Dim_on) is at a logic low level according to certain embodiments. As an example, the threshold voltage $V_x$ is equal to a predetermined voltage value that is selected from a range from 10 volts to 30 volts. For example, during a negative half cycle of the AC input voltage 472 (e.g., VAC), the logic signal 411 (e.g., Dim_on) remains at the logic high level during a time duration that corresponds to a phase range $\phi_1$. As an example, during a positive half cycle of the AC input voltage 472 (e.g., VAC), the logic signal 411 (e.g., Dim_on) remains at the logic high level during a time duration that corresponds to a phase range $\phi_2$. As shown in FIG. 9, the phase range $\phi_1$ and the phase range $\phi_2$ are not equal, indicating the size of the waveform during the negative half cycle of the AC input voltage 472 (e.g., VAC) and the size of the waveform during the positive half cycle of the AC input voltage 472 (e.g., VAC) are different according to some embodiments.

As shown by the waveforms 911 and 923, if the mode signal 421 indicates that the TRIAC dimmer 470 is a trailing-edge TRIAC dimmer, the delayed signal 523 (e.g., Dim_on_T) is generated by delaying, by a predetermined delay of time (e.g., $T_d$), a falling edge of the logic signal 411 (e.g., Dim_on) according to some embodiments. For example, the predetermined delay of time (e.g., $T_d$) is equal to a half cycle of the AC input voltage 472 (e.g., VAC) in time duration. As an example, the phase range $\phi_2$ is larger than the phase range $\phi_1$, and the phase range $\phi_2$ minus the phase range $\phi_1$ is equal to $\Delta\phi$. As shown by the waveforms 911, 923 and 921, the control signal 521 is the same as the delayed signal 523, except that during the first half cycle of the AC input voltage 472 (e.g., VAC), the control signal 521 is the same as the logic signal 411 (e.g., Dim_on), according to certain embodiments.

As shown by the waveforms 911, 921 and 932, if the logic signal 411 (e.g., Dim_on) or the control signal 521 is at the logic low level, the logic signal 432 (e.g., Dim_on') is at the logic low level, and if the logic signal 411 (e.g., Dim_on) and the control signal 521 both are at the logic high level, the logic signal 432 (e.g., Dim_on') is at the logic high level, according to some embodiments. For example, if the logic signal 411 (e.g., Dim_on) and the control signal 521 both are at the logic low level, the logic signal 432 (e.g., Dim_on') is at the logic low level. In certain examples, the pulse width of the logic signal 432 (e.g., Dim_on') during a negative half cycle of the AC input voltage 472 (e.g., VAC) is equal to the pulse width of the logic signal 432 (e.g., Dim_on') during a positive half cycle of the AC input voltage 472 (e.g., VAC). As an example, during the negative half cycle of the AC input voltage 472 (e.g., VAC), the pulse width of the logic signal 432 (e.g., Dim_on') corresponds to the phase range $\phi_1$, and during the positive half cycle of the AC input voltage 472 (e.g., VAC), the pulse width of the logic signal 432 (e.g., Dim_on') also corresponds to the phase range $\phi_1$.

As shown by the waveforms 932 and 991, the logic signal 432 (e.g., Dim_on') is used to generate the output current 491 (e.g., bed) according to certain embodiments. In some examples, the output current 491 (e.g., $I_{led}$) alternates between a high current level 993 and a low current level 995 (e.g. zero) to form one or more pulses at which the output current 491 (e.g., $I_{led}$) remains at the high current level 993. For example, a predetermined period of time after the logic signal 432 (e.g., Dim_on') changes from the logic low level to the logic high level, the output current 491 (e.g., $I_{led}$) changes from the low current level 995 (e.g. zero) to the high current level 993. As an example, the output current 491 (e.g., $I_{led}$) changes from the low current level 995 (e.g. zero) to the high current level 993 when the rectified voltage 483 (e.g., VIN) changes from being smaller than a threshold voltage $V_o$ to being larger than the threshold voltage $V_o$. As an example, the threshold voltage $V_o$ is higher than the threshold voltage $V_x$. For example, when the logic signal 432 (e.g., Dim_on') changes from the logic high level to the logic low level, the output current 491 (e.g., $I_{led}$) changes from the high current level 993 to the low current level 995 (e.g. zero). In certain examples, the pulse width of the output current 491 (e.g., $I_{led}$) during a negative half cycle of the AC input voltage 472 (e.g., VAC) is equal to the pulse width of the output current 491 (e.g., $I_{led}$) during a positive half cycle of the AC input voltage 472 (e.g., VAC). For example, the time duration during which the output current 491 (e.g., $I_{led}$) is at the current level 993 in the negative half cycle of the AC input voltage 472 (e.g., VAC) and the time duration during which the output current 491 (e.g., $I_{led}$) is at the current level 993 in the positive half cycle of the AC input voltage 472 (e.g., VAC) are the same. As an example, the average of the output current 491 (e.g., $I_{led}$) in the negative half cycle of the AC input voltage 472 (e.g., VAC) and the average of the output current 491 (e.g., $I_{led}$) in the positive half cycle of the AC input voltage 472 (e.g., VAC) are equal, preventing flickering of the one or more LEDs 490.

Figure 10:
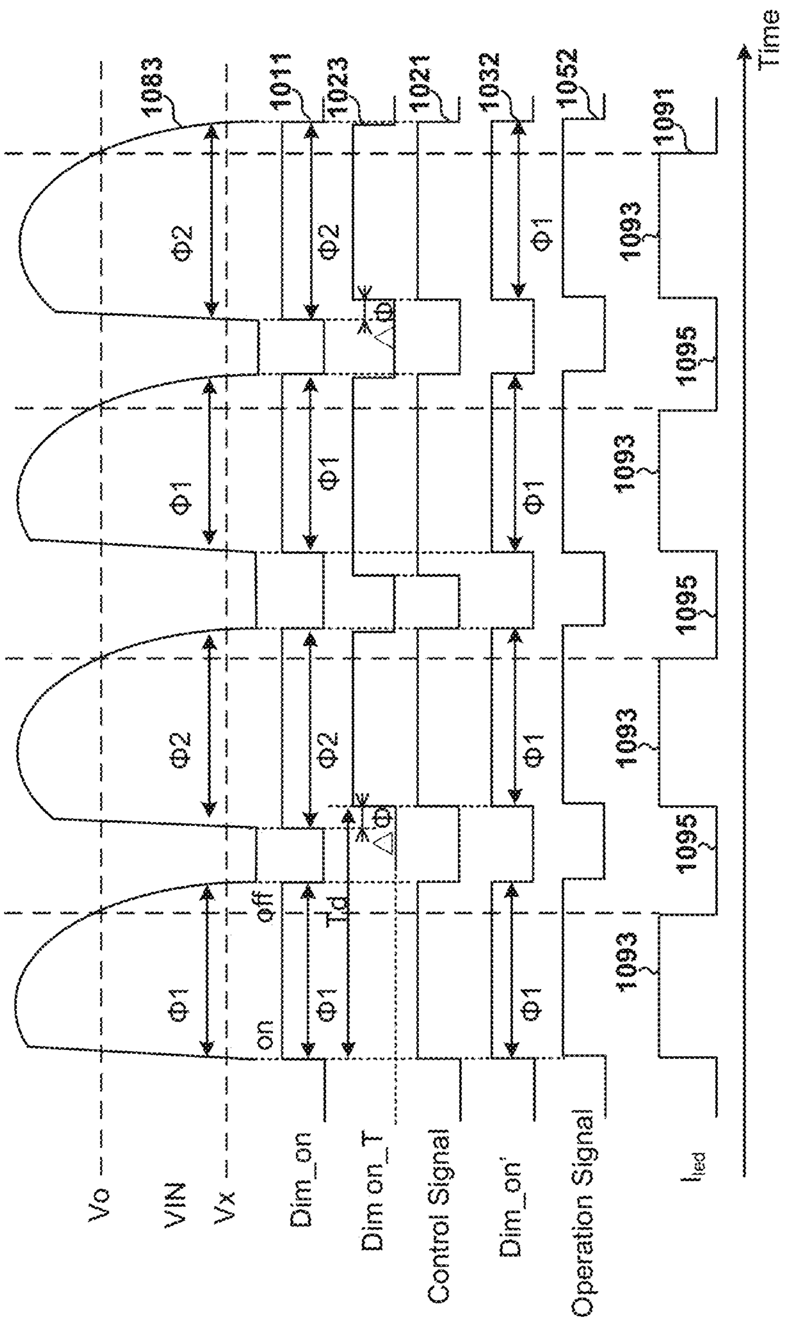
FIG. 10 shows simplified timing diagrams for the LED lighting system if the TRIAC dimmer is a leading-edge TRIAC dimmer as shown in FIG. 4, FIG. 5 and FIG. 7 according to some embodiments of the present invention.

FIG. 10 shows simplified timing diagrams for the LED lighting system 400 if the TRIAC dimmer 470 is a leading-edge TRIAC dimmer as shown in FIG. 4, FIG. 5 and FIG. 7 according to some embodiments of the present invention. These diagrams are merely examples, which should not unduly limit the scope of the claims. One of ordinary skill in the art would recognize many variations, alternatives, and modifications. As shown in FIG. 10, the waveform 1083 represents the rectified voltage 483 (e.g., VIN) as a function of time, the waveform 1011 represents the logic signal 411 (e.g., Dim_on) as a function of time, the waveform 1023 represents the delayed signal 523 (e.g., Dim_on_T) as a function of time, the waveform 1021 represents the control signal 521 as a function of time, the waveform 1032 represents the logic signal 432 (e.g., Dim_on') as a function of time, the waveform 1052 represents the operation signal 752 as a function of time, and the waveform 1091 represents the output current 491 (e.g., $I_{led}$) that flows through the one or more LEDs 490 as a function of time.

As shown by the waveforms 1083 and 1011, if the rectified voltage 483 (e.g., VIN) is larger than a threshold voltage $V_x$, the logic signal 411 (e.g., Dim_on) is at a logic high level, and if the rectified voltage 483 (e.g., VIN) is smaller than the threshold voltage $V_x$, the logic signal 411 (e.g., Dim_on) is at a logic low level according to certain embodiments. As an example, the threshold voltage $V_x$ is equal to a predetermined voltage value that is selected from a range from 10 volts to 30 volts. For example, during a negative half cycle of the AC input voltage 472 (e.g., VAC), the logic signal 411 (e.g., Dim_on) remains at the logic high level during a time duration that corresponds to a phase range $\phi_1$. As an example, during a positive half cycle of the AC input voltage 472 (e.g., VAC), the logic signal 411 (e.g., Dim_on) remains at the logic high level during a time duration that corresponds to a phase range $\phi_2$. As shown in FIG. 10, the phase range $\phi_1$ and the phase range $\phi_2$ are not equal, indicating the size of the waveform during the negative half cycle of the AC input voltage 472 (e.g., VAC) and the size of the waveform during the positive half cycle of the AC input voltage 472 (e.g., VAC) are different according to some embodiments.

As shown by the waveforms 1011 and 1023, if the mode signal 421 indicates that the TRIAC dimmer 470 is a leading-edge TRIAC dimmer, the delayed signal 523 (e.g., Dim_on_T) is generated by delaying, by a predetermined delay of time (e.g., $T_d$), a rising edge of the logic signal 411 (e.g., Dim_on) according to some embodiments. For example, the predetermined delay of time (e.g., $T_d$) is equal to a half cycle of the AC input voltage 472 (e.g., VAC) in time duration. As an example, the phase range $\phi_2$ is larger than the phase range $\phi_1$, and the phase range $\phi_2$ minus the phase range $\phi_1$ is equal to $\Delta\phi$. As shown by the waveforms 1011, 1023 and 1021, the control signal 521 is the same as the delayed signal 523, except that during the first half cycle of the AC input voltage 472 (e.g., VAC), the control signal 521 is the same as the logic signal 411 (e.g., Dim_on), according to certain embodiments.

As shown by the waveforms 1011, 1021 and 1032, if the logic signal 411 (e.g., Dim_on) or the control signal 521 is at the logic low level, the logic signal 432 (e.g., Dim_on') is at the logic low level, and if the logic signal 411 (e.g., Dim_on) and the control signal 521 both are at the logic high level, the logic signal 432 (e.g., Dim_on') is at the logic high level, according to some embodiments. For example, if the logic signal 411 (e.g., Dim_on) and the control signal 521 both are at the logic low level, the logic signal 432 (e.g., Dim_on') is at the logic low level. In certain examples, the pulse width of the logic signal 432 (e.g., Dim_on') during a negative half cycle of the AC input voltage 472 (e.g., VAC) is equal to the pulse width of the logic signal 432 (e.g., Dim_on') during a positive half cycle of the AC input voltage 472 (e.g., VAC). As an example, during the negative half cycle of the AC input voltage 472 (e.g., VAC), the pulse width of the logic signal 432 (e.g., Dim_on') corresponds to the phase range $\phi_1$, and during the positive half cycle of the AC input voltage 472 (e.g., VAC), the pulse width of the logic signal 432 (e.g., Dim_on') also corresponds to the phase range $\phi_1$.

As shown by the waveforms 1032 and 1052, the operation signal 752 is generated based at least in part on the logic signal 432 (e.g., Dim_on') according to certain embodiments. In some examples, when the logic signal 432 (e.g., Dim_on') changes from the logic low level to the logic high level, the operation signal 752 also changes from the logic low level to the logic high level. In certain examples, before, when, or after the logic signal 432 (e.g., Dim_on') changes from the logic high level to the logic low level, the operation signal 752 changes from the logic high level to the logic low level. As an example, when the logic signal 432 (e.g., Dim_on') changes from the logic high level to the logic low level, the operation signal 752 also changes from the logic high level to the logic low level.

As shown by the waveforms 1052 and 1091, the operation signal 752 is used to generate the output current 491 (e.g., $I_{led}$) according to some embodiments. In some examples, the output current 491 (e.g., $I_{led}$) alternates between a high current level 1093 and a low current level 1095 (e.g. zero) to form one or more pulses at which the output current 491 (e.g., $I_{led}$) remains at the high current level 1093. For example, when the operation signal 752 changes from the logic low level to the logic high level, the output current 491 (e.g., $I_{led}$) changes from the low current level 1095 (e.g. zero) to the high current level 1093. As an example, a predetermined period of time before the operation signal 752 changes from the logic high level to the logic low level, the output current 491 (e.g., $I_{led}$) changes from the high current level 1093 to the low current level 1095 (e.g. zero). For example, the output current 491 (e.g., $I_{led}$) changes from the high current level 1093 to the low current level 1095 (e.g. zero) when the rectified voltage 483 (e.g., VIN) changes from being larger than a threshold voltage $V_o$ to being smaller than the threshold voltage $V_o$. As an example, the threshold voltage $V_o$ is higher than the threshold voltage $V_x$. In certain examples, the pulse width of the output current 491 (e.g., $I_{led}$) during a negative half cycle of the AC input voltage 472 (e.g., VAC) is equal to the pulse width of the output current 491 (e.g., $I_{led}$) during a positive half cycle of the AC input voltage 472 (e.g., VAC). For example, the time duration during which the output current 491 (e.g., $I_{led}$) is at the current level 1093 in the negative half cycle of the AC input voltage 472 (e.g., VAC) and the time duration during which the output current 491 (e.g., bed) is at the current level 1093 in the positive half cycle of the AC input voltage 472 (e.g., VAC) are the same. As an example, the average of the output current 491 (e.g., $I_{led}$) in the negative half cycle of the AC input voltage 472 (e.g., VAC) and the average of the output current 491 (e.g., $I_{led}$) in the positive half cycle of the AC input voltage 472 (e.g., VAC) are equal, preventing flickering of the one or more LEDs 490.

Figure 11:
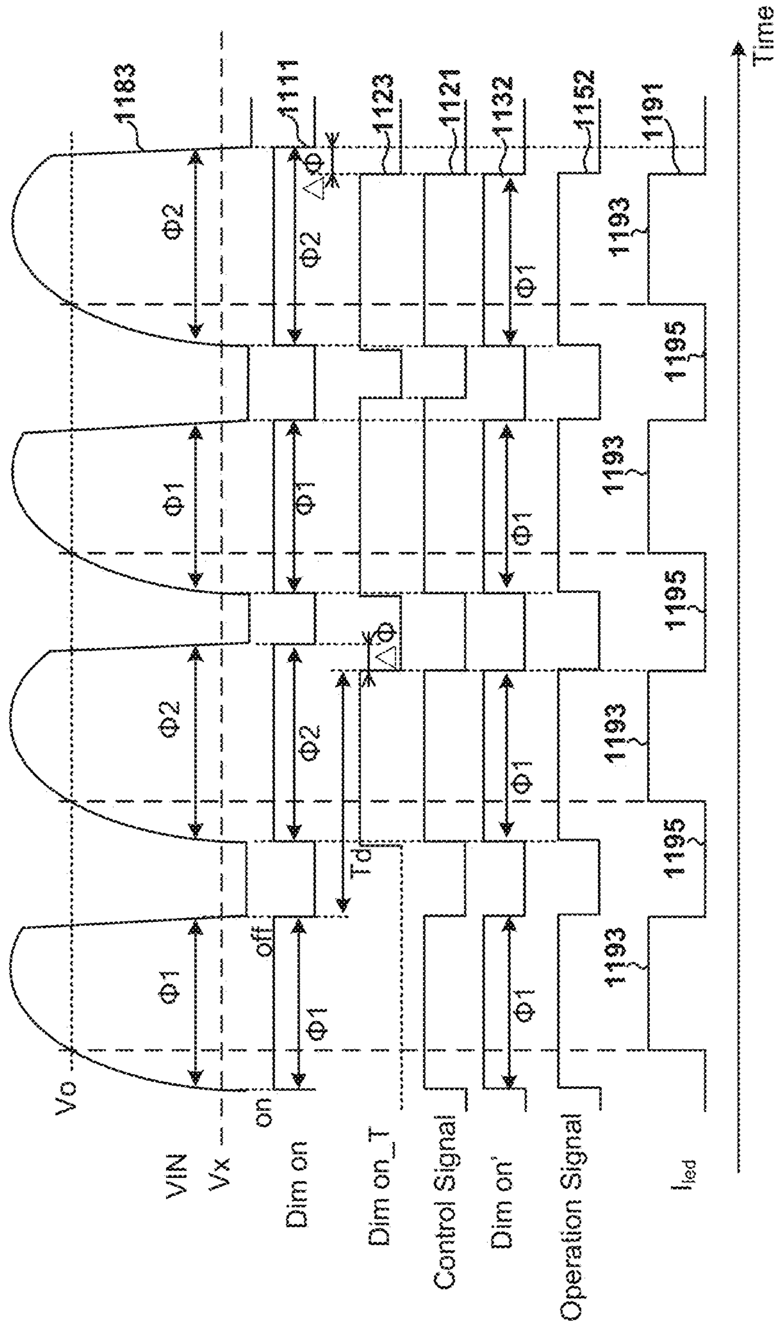
FIG. 11 shows simplified timing diagrams for the LED lighting system if the TRIAC dimmer is a trailing-edge TRIAC dimmer as shown in FIG. 4, FIG. 5 and FIG. 7 according to certain embodiments of the present invention.

FIG. 11 shows simplified timing diagrams for the LED lighting system 400 if the TRIAC dimmer 470 is a trailing-edge TRIAC dimmer as shown in FIG. 4, FIG. 5 and FIG. 7 according to certain embodiments of the present invention. These diagrams are merely examples, which should not unduly limit the scope of the claims. One of ordinary skill in the art would recognize many variations, alternatives, and modifications. As shown in FIG. 11, the waveform 1183 represents the rectified voltage 483 (e.g., VIN) as a function of time, the waveform 1111 represents the logic signal 411 (e.g., Dim_on) as a function of time, the waveform 1123 represents the delayed signal 523 (e.g., Dim_on_T) as a function of time, the waveform 1121 represents the control signal 521 as a function of time, the waveform 1132 represents the logic signal 432 (e.g., Dim_on') as a function of time, and the waveform 1191 represents the output current 491 (e.g., $I_{led}$) that flows through the one or more LEDs 490 as a function of time.

As shown by the waveforms 1183 and 1111, if the rectified voltage 483 (e.g., VIN) is larger than a threshold voltage $V_x$, the logic signal 411 (e.g., Dim_on) is at a logic high level, and if the rectified voltage 483 (e.g., VIN) is smaller than the threshold voltage $V_x$, the logic signal 411 (e.g., Dim_on) is at a logic low level according to certain embodiments. As an example, the threshold voltage $V_x$ is equal to a predetermined voltage value that is selected from a range from 10 volts to 30 volts. For example, during a negative half cycle of the AC input voltage 472 (e.g., VAC), the logic signal 411 (e.g., Dim_on) remains at the logic high level during a time duration that corresponds to a phase range $\phi_1$. As an example, during a positive half cycle of the AC input voltage 472 (e.g., VAC), the logic signal 411 (e.g., Dim_on) remains at the logic high level during a time duration that corresponds to a phase range $\phi_2$. As shown in FIG. 11, the phase range $\phi_1$ and the phase range $\phi_2$ are not equal, indicating the size of the waveform during the negative half cycle of the AC input voltage 472 (e.g., VAC) and the size of the waveform during the positive half cycle of the AC input voltage 472 (e.g., VAC) are different according to some embodiments.

As shown by the waveforms 1111 and 1123, if the mode signal 421 indicates that the TRIAC dimmer 470 is a trailing-edge TRIAC dimmer, the delayed signal 523 (e.g., Dim_on_T) is generated by delaying, by a predetermined delay of time (e.g., $T_d$), a falling edge of the logic signal 411 (e.g., Dim_on) according to some embodiments. For example, the predetermined delay of time (e.g., $T_d$) is equal to a half cycle of the AC input voltage 472 (e.g., VAC) in time duration. As an example, the phase range $\phi_2$ is larger than the phase range $\phi_1$, and the phase range $\phi_2$ minus the phase range $\phi_1$ is equal to $\Delta\phi$. As shown by the waveforms 1111, 1123 and 1121, the control signal 521 is the same as the delayed signal 523, except that during the first half cycle of the AC input voltage 472 (e.g., VAC), the control signal 521 is the same as the logic signal 411 (e.g., Dim_on), according to certain embodiments.

As shown by the waveforms 1111, 1121 and 1132, if the logic signal 411 (e.g., Dim_on) or the control signal 521 is at the logic low level, the logic signal 432 (e.g., Dim_on') is at the logic low level, and if the logic signal 411 (e.g., Dim_on) and the control signal 521 both are at the logic high level, the logic signal 432 (e.g., Dim_on') is at the logic high level, according to some embodiments. For example, if the logic signal 411 (e.g., Dim_on) and the control signal 521 both are at the logic low level, the logic signal 432 (e.g., Dim_on') is at the logic low level. In certain examples, the pulse width of the logic signal 432 (e.g., Dim_on') during a negative half cycle of the AC input voltage 472 (e.g., VAC) is equal to the pulse width of the logic signal 432 (e.g., Dim_on') during a positive half cycle of the AC input voltage 472 (e.g., VAC). As an example, during the negative half cycle of the AC input voltage 472 (e.g., VAC), the pulse width of the logic signal 432 (e.g., Dim_on') corresponds to the phase range $\phi_1$, and during the positive half cycle of the AC input voltage 472 (e.g., VAC), the pulse width of the logic signal 432 (e.g., Dim_on') also corresponds to the phase range $\phi_1$.

As shown by the waveforms 1132 and 1152, the operation signal 752 is generated based at least in part on the logic signal 432 (e.g., Dim_on') according to certain embodiments. In some examples, when the logic signal 432 (e.g., Dim_on') changes from the logic low level to the logic high level, the operation signal 752 also changes from the logic low level to the logic high level. In certain examples, before, when, or after the logic signal 432 (e.g., Dim_on') changes from the logic high level to the logic low level, the operation signal 752 changes from the logic high level to the logic low level. As an example, when the logic signal 432 (e.g., Dim_on') changes from the logic high level to the logic low level, the operation signal 752 also changes from the logic high level to the logic low level.

As shown by the waveforms 1152 and 1191, the operation signal 752 is used to generate the output current 491 (e.g., $I_{led}$) according to some embodiments. In some examples, the output current 491 (e.g., $I_{led}$) alternates between a high current level 1193 and a low current level 1195 (e.g. zero) to form one or more pulses at which the output current 491 (e.g., $I_{led}$) remains at the high current level 1193. For example, when the operation signal 752 changes from the logic high level to the logic low level, the output current 491 (e.g., $I_{led}$) changes from the high current level 1193 to the low current level 1195 (e.g. zero). As an example, a predetermined period of time after the operation signal 752 changes from the logic low level to the logic high level, the output current 491 (e.g., $I_{led}$) changes from the low current level 1195 (e.g. zero) to the high current level 1193. For example, the output current 491 (e.g., $I_{led}$) changes from the low current level 1195 (e.g. zero) to the high current level 1193 when the rectified voltage 483 (e.g., VIN) changes from being smaller than a threshold voltage $V_o$ to being larger than the threshold voltage $V_o$. As an example, the threshold voltage $V_o$ is higher than the threshold voltage $V_x$. In certain examples, the pulse width of the output current 491 (e.g., $I_{led}$) during a negative half cycle of the AC input voltage 472 (e.g., VAC) is equal to the pulse width of the output current 491 (e.g., $I_{led}$) during a positive half cycle of the AC input voltage 472 (e.g., VAC). For example, the time duration during which the output current 491 (e.g., $I_{led}$) is at the current level 1193 in the negative half cycle of the AC input voltage 472 (e.g., VAC) and the time duration during which the output current 491 (e.g., $I_{led}$) is at the current level 1193 in the positive half cycle of the AC input voltage 472 (e.g., VAC) are the same. As an example, the average of the output current 491 (e.g., $I_{led}$) in the negative half cycle of the AC input voltage 472 (e.g., VAC) and the average of the output current 491 (e.g., $I_{led}$) in the positive half cycle of the AC input voltage 472 (e.g., VAC) are equal, preventing flickering of the one or more LEDs 490.

Figure 12:
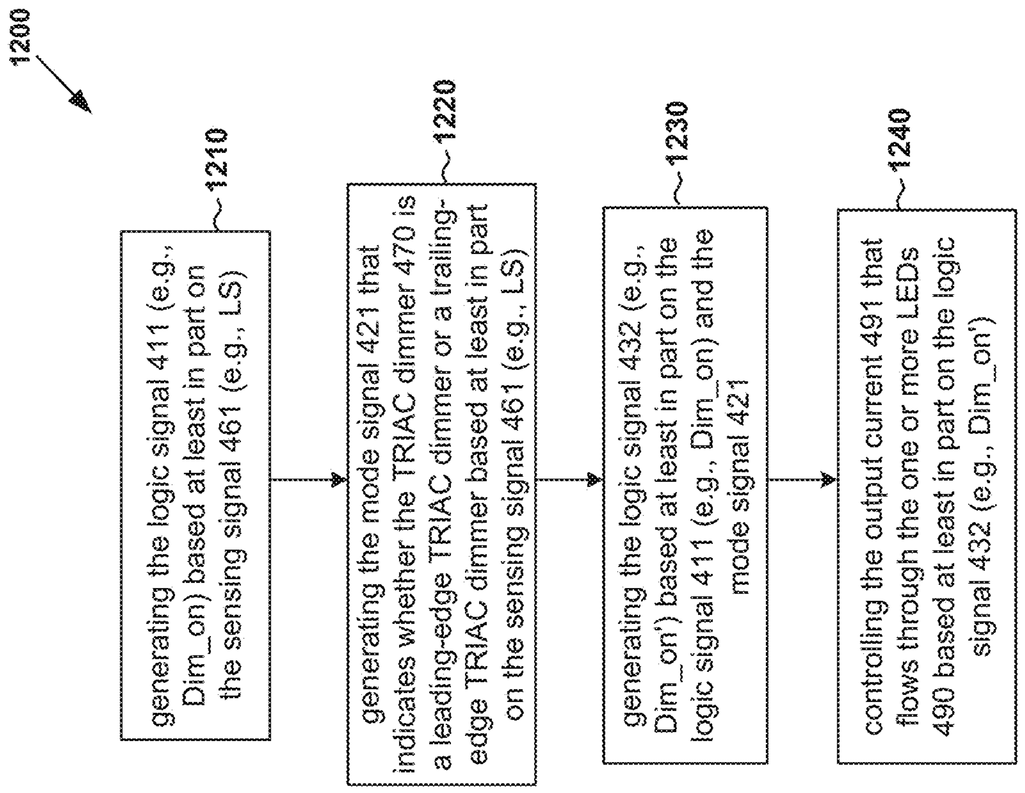
FIG. 12 is a simplified diagram showing a method for the LED lighting system as shown in FIG. 4 and FIG. 5 according to some embodiments of the present invention.

FIG. 12 is a simplified diagram showing a method for the LED lighting system 400 as shown in FIG. 4 and FIG. 5 according to some embodiments of the present invention. This diagram is merely an example, which should not unduly limit the scope of the claims. One of ordinary skill in the art would recognize many variations, alternatives, and modifications. The method 1200 includes a process 1210 for generating the logic signal 411 (e.g., Dim_on) based at least in part on the sensing signal 461 (e.g., LS), a process 1220 for generating the mode signal 421 that indicates whether the TRIAC dimmer 470 is a leading-edge TRIAC dimmer or a trailing-edge TRIAC dimmer based at least in part on the sensing signal 461 (e.g., LS), a process 1230 for generating the logic signal 432 (e.g., Dim_on') based at least in part on the logic signal 411 (e.g., Dim_on) and the mode signal 421, and a process 1240 for controlling the output current 491 that flows through the one or more LEDs 490 based at least in part on the logic signal 432 (e.g., Dim_on').

At the process 1210, the logic signal 411 (e.g., Dim_on) is generated based at least in part on the sensing signal 461 (e.g., LS) according to certain embodiments. At the process 1220, the mode signal 421 is generated based at least in part on the sensing signal 461 (e.g., LS) to indicate whether the TRIAC dimmer 470 is a leading-edge TRIAC dimmer or a trailing-edge TRIAC dimmer according to some embodiments.

At the process 1230, the logic signal 432 (e.g., Dim_on') is generated based at least in part on the logic signal 411

(e.g., Dim_on) and the mode signal 421 according to certain embodiments. In some examples, a rising edge and/or a falling edge of the logic signal 411 (e.g., Dim_on) is detected. In certain examples, using the mode signal 421 and the logic signal 411 (e.g., Dim_on), the control signal 521 is generated based at least in part on the detected rising edge of the logic signal 411 (e.g., Dim_on) or the detected falling edge of the logic signal 411 (e.g., Dim_on).

In some embodiments, using the mode signal 421, the delayed signal 523 (e.g., Dim_on_T) is generated based at least in part on the detected rising edge of the logic signal 411 (e.g., Dim_on) or the detected falling edge of the logic signal 411 (e.g., Dim_on). For example, if the mode signal 421 indicates that the TRIAC dimmer 470 is a leading-edge TRIAC dimmer, the delay sub-unit 522 generates the delayed signal 523 (e.g., Dim_on_T) by delaying, by a predetermined delay of time, the detected rising edge of the logic signal 411 (e.g., Dim_on). As an example, if the mode signal 421 indicates that the TRIAC dimmer 470 is a trailing-edge TRIAC dimmer, the delay sub-unit 522 generates the delayed signal 523 (e.g., Dim_on_T) by delaying, by the predetermined delay of time, the detected falling edge of the logic signal 411 (e.g., Dim_on).

In certain embodiments, the control signal 521 is generated based at least in part on the delayed signal 523 and the logic signal 411 (e.g., Dim_on). In some examples, the control signal 521 is the same as the delayed signal 523, except that during the first half cycle of the AC input voltage 472 (e.g., VAC), the control signal 521 is the same as the logic signal 411 (e.g., Dim_on). For example, the first half cycle of the AC input voltage 472 (e.g., VAC) is either a positive half cycle or a negative half cycle of the AC input voltage 472 (e.g., VAC). As an example, the first half cycle of the AC input voltage 472 (e.g., VAC) occurs immediately after the system 400 is powered on.

At the process 1240, the output current 491 that flows through the one or more LEDs 490 is controlled based at least in part on the logic signal 432 (e.g., Dim_on') according to some embodiments. For example, if the output current 491 that flows through the one or more LEDs 490 is not allowed to be generated, the output current 491 is equal to zero in magnitude.

Figure 13:
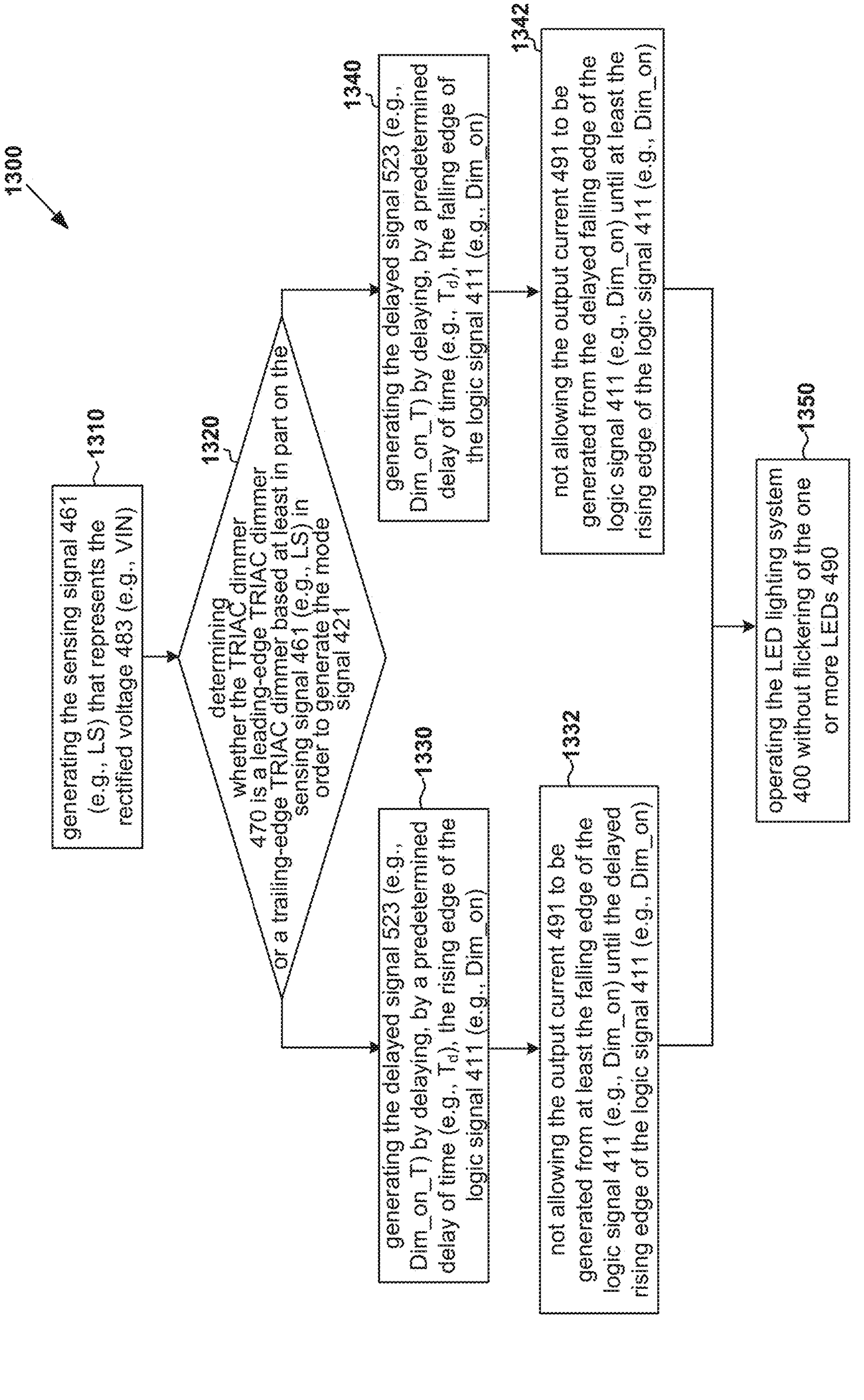
FIG. 13 is a simplified diagram showing a method for the LED lighting system as shown in FIG. 4 and FIG. 5 according to certain embodiments of the present invention.

FIG. 13 is a simplified diagram showing a method for the LED lighting system 400 as shown in FIG. 4 and FIG. 5 according to certain embodiments of the present invention. This diagram is merely an example, which should not unduly limit the scope of the claims. One of ordinary skill in the art would recognize many variations, alternatives, and modifications. The method 1300 includes a process 1310 for generating the sensing signal 461 (e.g., LS) that represents the rectified voltage 483 (e.g., VIN), a process 1320 for determining whether the TRIAC dimmer 470 is a leading-edge TRIAC dimmer or a trailing-edge TRIAC dimmer based at least in part on the sensing signal 461 (e.g., LS) in order to generate the mode signal 421, a process 1330 for generating the delayed signal 523 (e.g., Dim_on_T) by delaying, by a predetermined delay of time (e.g., $T_d$), the rising edge of the logic signal 411 (e.g., Dim_on), a process 1332 for not allowing the output current 491 to be generated from at least the falling edge of the logic signal 411 (e.g., Dim_on) until the delayed rising edge of the logic signal 411 (e.g., Dim_on), a process 1340 for generating the delayed signal 523 (e.g., Dim_on_T) by delaying, by a predetermined delay of time (e.g., $T_d$), the falling edge of the logic signal 411 (e.g., Dim_on), a process 1342 for not allowing the output current 491 to be generated from the delayed falling edge of the logic signal 411 (e.g., Dim_on) until at least the rising edge of the logic signal 411 (e.g., Dim_on), a process 1350 for operating the LED lighting system 400 without flickering of the one or more LEDs 490.

At the process 1310, the sensing signal 461 (e.g., LS) that represents the rectified voltage 483 (e.g., VIN) is generated according to some embodiments. At the process 1320, whether the TRIAC dimmer 470 is a leading-edge TRIAC dimmer or a trailing-edge TRIAC dimmer is determined based at least in part on the sensing signal 461 (e.g., LS) in order to generate the mode signal 421 according to certain embodiments. In some examples, if the TRIAC dimmer 470 is determined to be a leading-edge TRIAC dimmer, the processes 1330, 1332, and 1350 are performed. In certain examples, if the TRIAC dimmer 470 is determined to be a trailing-edge TRIAC dimmer, the processes 1340, 1342, and 1350 are performed.

At the process 1330, the delayed signal 523 (e.g., Dim_on_T) is generated by delaying, by a predetermined delay of time (e.g., $T_d$), the rising edge of the logic signal 411 (e.g., Dim_on) according to some embodiments. For example, the predetermined delay of time (e.g., $T_d$) is equal to a half cycle of the AC input voltage 472 (e.g., VAC) in time duration. At the process 1332, the output current 491 is not allowed to be generated from at least the falling edge of the logic signal 411 (e.g., Dim_on) until the delayed rising edge of the logic signal 411 (e.g., Dim_on) according to certain embodiments. As an example, if the output current 491 that flows through the one or more LEDs 490 is not allowed to be generated, the output current 491 is equal to zero in magnitude.

At the process 1340, the delayed signal 523 (e.g., Dim_on_T) is generated by delaying, by a predetermined delay of time (e.g., $T_d$), the falling edge of the logic signal 411 (e.g., Dim_on) according to some embodiments. For example, the predetermined delay of time (e.g., $T_d$) is equal to a half cycle of the AC input voltage 472 (e.g., VAC) in time duration. At the process 1342, the output current 491 is not allowed to be generated from the delayed falling edge of the logic signal 411 (e.g., Dim_on) until at least the rising edge of the logic signal 411 (e.g., Dim_on) according to certain embodiments. As an example, if the output current 491 that flows through the one or more LEDs 490 is not allowed to be generated, the output current 491 is equal to zero in magnitude.

At the process 1350, the LED lighting system 400 operates without flickering of the one or more LEDs 490. For example, the size of the waveform during the negative half cycle of the AC input voltage 472 (e.g., VAC) and the size of the waveform during the positive half cycle of the AC input voltage 472 (e.g., VAC) are different. As an example, the average of the output current 491 in the negative half cycle of the AC input voltage 472 (e.g., VAC) and the average of the output current 491 in the positive half cycle of the AC input voltage 472 (e.g., VAC) are equal, preventing flickering of the one or more LEDs 490.

Certain embodiments of the present invention prevent flickering of the one or more LEDs even if the waveform during the positive half cycle of the AC input voltage and the waveform during the negative half cycle of the AC input voltage are significantly different. Some embodiments of the present invention improve effect of the dimming control and also improve compatibility of the TRIAC dimmer, without increasing bill of materials (BOM) for the components that are external to the chip.

According to some embodiments, a system for controlling one or more light emitting diodes includes: a phase detector configured to process information associated with a rectified voltage generated by a rectifier and related to a TRIAC dimmer, the rectified voltage corresponding to a first waveform during a first half cycle of an AC voltage and corresponding to a second waveform during a second half cycle of the AC voltage, the phase detector being further configured to generate a phase detection signal representing a first time duration during which the first waveform indicates that the rectified voltage is larger than a predetermined threshold and representing a second time duration during which the second waveform indicates that the rectified voltage is larger than the predetermined threshold; a mode detector configured to process information associated with the rectified voltage, determine whether the TRIAC dimmer is a leading-edge TRIAC dimmer or a trailing-edge TRIAC dimmer based on at least information associated with the rectified voltage, and generate a mode detection signal that indicates whether the TRIAC dimmer is the leading-edge TRIAC dimmer or the trailing-edge TRIAC dimmer; a modified signal generator configured to receive the phase detection signal from the phase detector and the mode detection signal from the mode detector, modify the phase detection signal based at least in part on the mode detection signal, and generate a modified signal representing a third time duration corresponding to the first half cycle of the AC voltage and a fourth time duration corresponding to the second half cycle of the AC voltage; and a current controller configured to receive the modified signal, the current controller being further configured to control, based at least in part of the modified signal, a first current flowing through one or more light emitting diodes configured to receive the rectified voltage; wherein: the first time duration and the second time duration are different in magnitude; and the third time duration and the fourth time duration are the same in magnitude. For example, the system for controlling one or more light emitting diodes is implemented according to at least FIG. 4.

In certain examples, a first average of the first current corresponding to the first half cycle of the AC voltage and a second average of the first current corresponding to the second half cycle of the AC voltage are equal in magnitude. In some examples, the first time duration is smaller than the second time duration in magnitude; the third time duration is equal to the first time duration in magnitude; and the fourth time duration is smaller than the second duration in magnitude. In certain examples, the first time duration is larger than the second time duration in magnitude; the third time duration is smaller than the first time duration in magnitude; and the fourth time duration is equal to the second duration in magnitude.

In some examples, the modified signal generator includes a control signal generator configured to: process information associated with the phase detection signal; delay, by a predetermined delay of time, one or more rising edges of the phase detection signal or one or more falling edges of the phase detection signal based at least in part on the mode detection signal; and generate a control signal based at least in part on the one or more delayed rising edges or the one or more delayed falling edges. In certain examples, the control signal generator is further configured to: delay, by the predetermined delay of time, the one or more rising edges of the phase detection signal if the mode detection signal indicates that the TRIAC dimmer is the leading-edge TRIAC dimmer; and delay, by the predetermined delay of time, the one or more falling edges of the phase detection signal if the mode detection signal indicates that the TRIAC dimmer is the trailing-edge TRIAC dimmer. In some examples, the control signal generator is further configured to generate the control signal based at least in part on the one or more delayed rising edges or the one or more delayed falling edges and also based at least in part on the phase detection signal.

In certain examples, wherein the control signal generator includes a delayed signal generator configured to: receive the mode detection signal; delay, by the predetermined delay of time, the one or more rising edges of the phase detection signal or the one or more falling edges of the phase detection signal based at least in part on the mode detection signal; and generate a delayed signal based at least in part on the one or more delayed rising edges or the one or more delayed falling edges. In some examples, the control signal generator further includes a signal controller configured to receive the delayed signal and the phase detection signal and generate the control signal based at least in part on the delayed signal and the phase detection signal. In certain examples, the control signal generator is further configured to generate the control signal that is the same as the delayed signal, except that during the first half cycle of the AC input voltage, the control signal is the same as the phase detection signal.

In some examples, the modified signal generator further includes an output signal generator configured to receive the control signal and the phase detection signal and generate the modified signal based at least in part on the control signal and the phase detection signal. In certain examples, the output signal generator includes an AND gate, the AND gate being configured to receive the control signal and the phase detection signal and generate the modified signal based at least in part on the control signal and the phase detection signal. In some examples, the predetermined delay of time is equal to the first half cycle of the AC voltage in duration; and the predetermined delay of time is equal to the second half cycle of the AC voltage in duration.

In certain examples, the current controller includes: a control signal generator configured to receive the modified signal and generate a drive signal based at least in part on the modified signal; a switch configured to receive the modified signal and become closed or open based at least in part on the modified signal; and a transistor including a first transistor terminal, a second transistor terminal and a third transistor terminal, the first transistor terminal being coupled to the control signal generator and the switch, the second transistor terminal being coupled to the one or more light emitting diodes. In some examples, the switch is further configured to be: open if the modified signal is at a first logic level; and closed if the modified signal is at a second logic level; wherein the first logic level and the second logic level are different. In certain examples, the modified signal is at the first logic level during the third time duration within the first half cycle of the AC voltage; and the modified signal is at the second logic level outside the third time duration within the first half cycle of the AC voltage. In some examples, the modified signal is at the first logic level during the fourth time duration within the second half cycle of the AC voltage; and the modified signal is at the second logic level outside the fourth time duration within the second half cycle of the AC voltage. In certain examples, the first logic level is a logic high level; and the second logic level is a logic low level. In some examples, if the switch is closed, the first current flowing through the one or more light emitting diodes is equal to zero in magnitude; and if the switch is open, the first current flowing through the one or more light emitting diodes is equal to a predetermined value in magnitude based at least in part on the drive signal; wherein the predetermined value is larger than zero.

In certain examples, the current controller further includes a resistor including a first resistor terminal and a second resistor terminal; and the switch including a first switch terminal and a second switch terminal; wherein: the first resistor terminal is connected to the third transistor terminal; the second resistor terminal is biased to a ground voltage; the first switch terminal is connected to the first transistor terminal; and the second switch terminal is biased to the ground voltage.

In some examples, the current controller includes: a control signal generator configured to receive the modified signal and generate a drive signal based at least in part on the modified signal; an operation signal generator configured to receive the modified signal and generate an operation signal based at least in part on the modified signal; a switch configured to receive the operation signal and become closed or open based at least in part on the operation signal; and a transistor including a first transistor terminal, a second transistor terminal and a third transistor terminal, the first transistor terminal being coupled to the control signal generator and the switch, the second transistor terminal being coupled to the one or more light emitting diodes. In certain examples, the switch is further configured to be: open if the operation signal is at a first logic level; and closed if the operation signal is at a second logic level; wherein the first logic level and the second logic level are different. In some examples, the operation signal generator is further configured to: change the operation signal from the second logic level to the first logic level at a same time as the modified signal; and change the operation signal from the first logic level to the second logic level at a different time from the modified signal. In certain examples, the operation signal generator is further configured to: change the operation signal from the second logic level to the first logic level at a same time as the modified signal; and change the operation signal from the first logic level to the second logic level at a same time from the modified signal.

In some examples, the system for controlling one or more light emitting diodes further includes: a bleeder current controller and generator configured to receive the mode detection signal and generate a bleeder current based at least in part on the mode selection signal to ensure that a second current flowing through the TRIAC dimmer does not fall below a holding current of the TRIAC dimmer. In certain examples, the system for controlling one or more light emitting diodes further includes: a voltage detector configured to receive the rectified voltage and generate a sensing signal based at least in part on the rectified voltage; wherein the phase detector is further configured to: receive the sensing signal; and generate the phase detection signal based at least in part on the sensing signal; wherein the mode detector is further configured to: receive the sensing signal; and generate the mode detection signal based at last in part on the sensing signal. In some examples, the voltage detector includes a voltage divider including a first resistor and a second resistor.

According to certain embodiments, a system for controlling one or more light emitting diodes includes: a phase detector configured to process information associated with a rectified voltage generated by a rectifier and related to a TRIAC dimmer, the rectified voltage corresponding to a first waveform during a first half cycle of an AC voltage and corresponding to a second waveform during a second half cycle of the AC voltage, the signal detector being further configured to generate a phase detection signal representing a first time duration during which the first waveform indicates that the rectified voltage is larger than a predetermined threshold and representing a second time duration during which the second waveform indicates that the rectified voltage is larger than the predetermined threshold; a mode detector configured to process information associated with the rectified voltage, determine whether the TRIAC dimmer is a leading-edge TRIAC dimmer or a trailing-edge TRIAC dimmer based on at least information associated with the rectified voltage, and generate a mode detection signal that indicates whether the TRIAC dimmer is the leading-edge TRIAC dimmer or the trailing-edge TRIAC dimmer; and a modified signal generator configured to receive the phase detection signal from the phase detector and the mode detection signal from the mode detector, the modified signal generator being further configured to generate, based at least in part on the phase detection signal and the mode detection signal, a modified signal representing a third time duration corresponding to the first half cycle of the AC voltage and a fourth time duration corresponding to the second half cycle of the AC voltage; wherein: the first time duration is smaller than the second time duration in magnitude; the third time duration is equal to the first time duration in magnitude; the fourth time duration is smaller than the second duration in magnitude; and the third time duration and the fourth time duration are equal in magnitude. For example, the system for controlling one or more light emitting diodes is implemented according to at least FIG. 4.

According to some embodiments, a method for controlling one or more light emitting diodes includes: processing information associated with a rectified voltage related to a TRIAC dimmer, the rectified voltage corresponding to a first waveform during a first half cycle of an AC voltage and corresponding to a second waveform during a second half cycle of the AC voltage; generating a phase detection signal representing a first time duration during which the first waveform indicates that the rectified voltage is larger than a predetermined threshold and representing a second time duration during which the second waveform indicates that the rectified voltage is larger than the predetermined threshold; determining whether the TRIAC dimmer is a leading-edge TRIAC dimmer or a trailing-edge TRIAC dimmer based on at least information associated with the rectified voltage; generating a mode detection signal that indicates whether the TRIAC dimmer is the leading-edge TRIAC dimmer or the trailing-edge TRIAC dimmer; receiving the phase detection signal and the mode detection signal; modifying the phase detection signal based at least in part on the mode detection signal; generating a modified signal representing a third time duration corresponding to the first half cycle of the AC voltage and a fourth time duration corresponding to the second half cycle of the AC voltage; receiving the modified signal; and controlling, based at least in part of the modified signal, a first current flowing through one or more light emitting diodes configured to receive the rectified voltage; wherein: the first time duration and the second time duration are different in magnitude; and the third time duration and the fourth time duration are the same in magnitude. For example, the method for controlling one or more light emitting diodes is implemented according to at least FIG. 4.

According to certain embodiments, a method for controlling one or more light emitting diodes includes: processing information associated with a rectified voltage related to a TRIAC dimmer, the rectified voltage corresponding to a first waveform during a first half cycle of an AC voltage and corresponding to a second waveform during a second half cycle of the AC voltage; generating a phase detection signal representing a first time duration during which the first waveform indicates that the rectified voltage is larger than a predetermined threshold and representing a second time duration during which the second waveform indicates that the rectified voltage is larger than the predetermined threshold; determining whether the TRIAC dimmer is a leading-edge TRIAC dimmer or a trailing-edge TRIAC dimmer based on at least information associated with the rectified voltage; generating a mode detection signal that indicates whether the TRIAC dimmer is the leading-edge TRIAC dimmer or the trailing-edge TRIAC dimmer; receiving the phase detection signal and the mode detection signal; and generating, based at least in part on the phase detection signal and the mode detection signal, a modified signal representing a third time duration corresponding to the first half cycle of the AC voltage and a fourth time duration corresponding to the second half cycle of the AC voltage; wherein: the first time duration is smaller than the second time duration in magnitude; the third time duration is equal to the first time duration in magnitude; the fourth time duration is smaller than the second duration in magnitude; and the third time duration and the fourth time duration are equal in magnitude. For example, the method for controlling one or more light emitting diodes is implemented according to at least FIG. 4.

For example, some or all components of various embodiments of the present invention each are, individually and/or in combination with at least another component, implemented using one or more software components, one or more hardware components, and/or one or more combinations of software and hardware components. As an example, some or all components of various embodiments of the present invention each are, individually and/or in combination with at least another component, implemented in one or more circuits, such as one or more analog circuits and/or one or more digital circuits. For example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments.

What is claimed is:

1. A system for controlling one or more light emitting diodes, the system comprising:

a modified signal generator configured to receive a phase detection signal associated with a rectified voltage and a mode detection signal associated with a TRIAC dimmer, the rectified voltage corresponding to a first waveform during a first half cycle of an AC voltage and corresponding to a second waveform during a second half cycle of the AC voltage, the phase detection signal representing a first time duration during which the first waveform indicates that the rectified voltage is larger than a predetermined threshold and representing a second time duration during which the second waveform indicates that the rectified voltage is larger than the predetermined threshold, modify the phase detection signal based at least in part on the mode detection signal, and generate a modified signal representing a third time duration corresponding to the first half cycle of the AC voltage and a fourth time duration corresponding to the second half cycle of the AC voltage; and a current controller configured to receive the modified signal, the current controller being further configured to control, based at least in part of the modified signal, a first current flowing through the one or more light emitting diodes configured to receive the rectified voltage;

wherein:

the first time duration and the second time duration are different in magnitude; and the third time duration and the fourth time duration are the same in magnitude.

2. The system of claim 1 wherein a first average of the first current corresponding to the first half cycle of the AC voltage and a second average of the first current corresponding to the second half cycle of the AC voltage are equal in magnitude.

3. The system of claim 1 wherein:

the first time duration is smaller than the second time duration in magnitude;

the third time duration is equal to the first time duration in magnitude; and the fourth time duration is smaller than the second time duration in magnitude.

4. The system of claim 1 wherein:

the first time duration is larger than the second time duration in magnitude;

the third time duration is smaller than the first time duration in magnitude; and the fourth time duration is equal to the second time duration in magnitude.

5. The system of claim 1 wherein the modified signal generator includes:

a control signal generator configured to:

process information associated with the phase detection signal;

delay, by a predetermined delay of time, one or more rising edges of the phase detection signal or one or more falling edges of the phase detection signal based at least in part on the mode detection signal; and generate a control signal based at least in part on the one or more delayed rising edges or the one or more delayed falling edges.

6. The system of claim 5 wherein the control signal generator is further configured to:

delay, by the predetermined delay of time, the one or more rising edges of the phase detection signal if the mode detection signal indicates that the TRIAC dimmer is a leading-edge TRIAC dimmer; and delay, by the predetermined delay of time, the one or more falling edges of the phase detection signal if the mode detection signal indicates that the TRIAC dimmer is a trailing-edge TRIAC dimmer.

7. The system of claim 5 wherein the control signal generator is further configured to generate the control signal based at least in part on the one or more delayed rising edges or the one or more delayed falling edges and also based at least in part on the phase detection signal.

8. The system of claim 5 wherein the control signal generator includes:

a delayed signal generator configured to:

receive the mode detection signal;

delay, by the predetermined delay of time, the one or more rising edges of the phase detection signal or the one or more falling edges of the phase detection signal based at least in part on the mode detection signal; and generate a delayed signal based at least in part on the one or more delayed rising edges or the one or more delayed falling edges.

9. The system of claim 8 wherein the control signal generator further includes a signal controller configured to receive the delayed signal and the phase detection signal and generate the control signal based at least in part on the delayed signal and the phase detection signal.

10. The system of claim 9 wherein the control signal generator is further configured to generate the control signal that is the same as the delayed signal, except that during the first half cycle of the AC voltage, the control signal is the same as the phase detection signal.

11. The system of claim 5 wherein the modified signal generator further includes an output signal generator configured to receive the control signal and the phase detection signal and generate the modified signal based at least in part on the control signal and the phase detection signal.

12. The system of claim 11 wherein the output signal generator includes an AND gate, the AND gate being configured to receive the control signal and the phase detection signal and generate the modified signal based at least in part on the control signal and the phase detection signal.

13. The system of claim 5 wherein:

the predetermined delay of time is equal to the first half cycle of the AC voltage in duration.

14. The system of claim 1 wherein the current controller includes:

a control signal generator configured to receive the modified signal and generate a drive signal based at least in part on the modified signal;

a switch configured to receive the modified signal and become closed or open based at least in part on the modified signal; and a transistor including a first transistor terminal, a second transistor terminal and a third transistor terminal, the first transistor terminal being coupled to the control signal generator and the switch, the second transistor terminal being coupled to the one or more light emitting diodes.

15. The system of claim 14 wherein the switch is further configured to be:

open if the modified signal is at a first logic level; and closed if the modified signal is at a second logic level;

wherein the first logic level and the second logic level are different.

16. The system of claim 15 wherein:

the modified signal is at the first logic level during the third time duration within the first half cycle of the AC voltage; and the modified signal is at the second logic level outside the third time duration within the first half cycle of the AC voltage.

17. The system of claim 16 wherein:

the modified signal is at the first logic level during the fourth time duration within the second half cycle of the AC voltage; and the modified signal is at the second logic level outside the fourth time duration within the second half cycle of the AC voltage.

18. The system of claim 15 wherein:

the first logic level is a logic high level; and the second logic level is a logic low level.

19. The system of claim 15 wherein:

if the switch is closed, the first current flowing through the one or more light emitting diodes is equal to zero in magnitude; and if the switch is open, the first current flowing through the one or more light emitting diodes is equal to a predetermined value in magnitude based at least in part on the drive signal;

wherein the predetermined value is larger than zero.

20. The system of claim 14 wherein:

the current controller further includes a resistor including a first resistor terminal and a second resistor terminal; and the switch including a first switch terminal and a second switch terminal;

wherein:

the first resistor terminal is connected to the third transistor terminal;

the second resistor terminal is biased to a ground voltage;

the first switch terminal is connected to the first transistor terminal; and the second switch terminal is biased to the ground voltage.

21. The system of claim 1 wherein the current controller includes:

a control signal generator configured to receive the modified signal and generate a drive signal based at least in part on the modified signal;

an operation signal generator configured to receive the modified signal and generate an operation signal based at least in part on the modified signal;

a switch configured to receive the operation signal and become closed or open based at least in part on the operation signal; and a transistor including a first transistor terminal, a second transistor terminal and a third transistor terminal, the first transistor terminal being coupled to the control signal generator and the switch, the second transistor terminal being coupled to the one or more light emitting diodes.

22. The system of claim 21 wherein the switch is further configured to be:

open if the operation signal is at a first logic level; and closed if the operation signal is at a second logic level;

wherein the first logic level and the second logic level are different.

23. The system of claim 22 wherein the operation signal generator is further configured to:

change the operation signal from the second logic level to the first logic level at a same time as the modified signal; and change the operation signal from the first logic level to the second logic level at a different time from the modified signal.

24. The system of claim 22 wherein the operation signal generator is further configured to:

change the operation signal from the second logic level to the first logic level at a same time as the modified signal; and change the operation signal from the first logic level to the second logic level at a same time from the modified signal.

25. The system of claim 1, and further comprising:

a bleeder current controller and generator configured to receive the mode detection signal and generate a bleeder current based at least in part on the mode selection signal to ensure that a second current flowing through the TRIAC dimmer does not fall below a holding current of the TRIAC dimmer.

26. The system of claim 1, and further comprising:
a voltage detector configured to receive the rectified voltage and generate a sensing signal based at least in part on the rectified voltage; and
a phase detector configured to:
receive the sensing signal; and
generate the phase detection signal based at least in part on the sensing signal; and
a mode detector configured to:
receive the sensing signal; and
generate the mode detection signal based at last in part on the sensing signal.

27. The system of claim 26 wherein the voltage detector includes a voltage divider including a first resistor and a second resistor.

28. A system for controlling one or more light emitting diodes, the system comprising:
a modified signal generator configured to receive a phase detection signal associated with a rectified voltage and a mode detection signal associated a TRIAC dimmer, the rectified voltage corresponding to a first waveform during a first half cycle of an AC voltage and corresponding to a second waveform during a second half cycle of the AC voltage, the phase detection signal representing a first time duration during which the first waveform indicates that the rectified voltage is larger than a predetermined threshold and representing a second time duration during which the second waveform indicates that the rectified voltage is larger than the predetermined threshold, the modified signal generator being further configured to generate, based at least in part on the phase detection signal and the mode detection signal, a modified signal representing a third time duration corresponding to the first half cycle of the AC voltage and a fourth time duration corresponding to the second half cycle of the AC voltage;
wherein:
the first time duration is smaller than the second time duration in magnitude;
the third time duration is equal to the first time duration in magnitude;
the fourth time duration is smaller than the second time duration in magnitude; and
the third time duration and the fourth time duration are equal in magnitude.

29. A method for controlling one or more light emitting diodes, the method comprising:
receiving a phase detection signal associated with a rectified voltage and a mode detection signal associated a TRIAC dimmer, the rectified voltage corresponding to a first waveform during a first half cycle of an AC voltage and corresponding to a second waveform during a second half cycle of the AC voltage, the phase detection signal representing a first time duration during which the first waveform indicates that the rectified voltage is larger than a predetermined threshold and representing a second time duration during which the second waveform indicates that the rectified voltage is larger than the predetermined threshold;
modifying the phase detection signal based at least in part on the mode detection signal;
generating a modified signal representing a third time duration corresponding to the first half cycle of the AC voltage and a fourth time duration corresponding to the second half cycle of the AC voltage;
receiving the modified signal; and
controlling, based at least in part of the modified signal, a first current flowing through the one or more light emitting diodes configured to receive the rectified voltage;
wherein:
the first time duration and the second time duration are different in magnitude; and
the third time duration and the fourth time duration are the same in magnitude.

30. A method for controlling one or more light emitting diodes, the method comprising:
receiving a phase detection signal associated with a rectified voltage and a mode detection signal associated a TRIAC dimmer, the rectified voltage corresponding to a first waveform during a first half cycle of an AC voltage and corresponding to a second waveform during a second half cycle of the AC voltage, the phase detection signal representing a first time duration during which the first waveform indicates that the rectified voltage is larger than a predetermined threshold and representing a second time duration during which the second waveform indicates that the rectified voltage is larger than the predetermined threshold; and
generating, based at least in part on the phase detection signal and the mode detection signal, a modified signal representing a third time duration corresponding to the first half cycle of the AC voltage and a fourth time duration corresponding to the second half cycle of the AC voltage;
wherein:
the first time duration is smaller than the second time duration in magnitude;
the third time duration is equal to the first time duration in magnitude;
the fourth time duration is smaller than the second time duration in magnitude; and
the third time duration and the fourth time duration are equal in magnitude.

* * * * *